(12) United States Patent
Buckley et al.

(10) Patent No.: US 11,458,002 B2
(45) Date of Patent: Oct. 4, 2022

(54) ORAL APPLICATOR DEVICE

(71) Applicant: Gertruda Hubertina Westrupp, Auckland (NZ)

(72) Inventors: Paul Fleming Buckley, Auckland (NZ); Gertruda Hubertina Westrupp, Auckland (NZ)

(73) Assignee: Gertruda Hubertina Westrupp, Auckland (NZ)

( * ) Notice: Subject to any disclaimer, the term of this patent is extended or adjusted under 35 U.S.C. 154(b) by 0 days.

(21) Appl. No.: 17/064,292

(22) Filed: Oct. 6, 2020

(65) Prior Publication Data
US 2021/0282912 A1    Sep. 16, 2021

(30) Foreign Application Priority Data
Mar. 12, 2020    (NZ) .................................... 762564

(51) Int. Cl.
*A61C 19/06* (2006.01)
*A61C 19/08* (2006.01)

(52) U.S. Cl.
CPC ............ *A61C 19/063* (2013.01); *A61C 19/08* (2013.01)

(58) Field of Classification Search
CPC ..... A61C 19/063; A61C 19/08; A61C 19/066; A61C 9/00; A61C 9/0006; A61C 7/08
See application file for complete search history.

(56) References Cited

U.S. PATENT DOCUMENTS

| | | | | |
|---|---|---|---|---|
| 1,622,616 A | * | 3/1927 | Temple | A61C 19/063 604/77 |
| 2,257,709 A | | 9/1941 | Anderson | |
| 3,234,942 A | * | 2/1966 | Simor | A61C 19/063 604/20 |
| 3,527,219 A | * | 9/1970 | Greenberg | A61K 6/20 433/25 |
| 3,624,909 A | | 12/1971 | Greenberg | |
| 5,085,585 A | | 2/1992 | Zimble | |

(Continued)

FOREIGN PATENT DOCUMENTS

CA    2320473 C  *  8/2007  ........... A61C 19/063

*Primary Examiner* — Jacqueline T Johanas
*Assistant Examiner* — Shannel Nicole Belk
(74) *Attorney, Agent, or Firm* — Christopher M. Scherer; DeWitt LLP

(57) ABSTRACT

An intraoral applicator device is described herein that is configured to transfer medicament from the applicator to the gums of a patient. The device and methods of use may assist in topically applying medicament e.g. a topical anaesthetic to the gums of a patient without the need for or use of needles or syringes. In one embodiment, the intraoral applicator device may comprise a body with a shape and configuration that generally conforms with at least part of the shape of the teeth and gums of a patient's oral cavity. The device further comprises a holder portion, the holder portion comprising a frame, the frame being configured to clamp over the teeth about a region of the patient's oral cavity such that, when fitted to the patient's oral cavity, at least a part of the holder portion is configured to be held between the patient's teeth when the patient bites their jaws together, the holder portion also gripping at least part of the body. Methods of delivering medicament to at least a portion of the gums of a patient in need thereof using the above device are also described.

21 Claims, 19 Drawing Sheets

(56) References Cited

U.S. PATENT DOCUMENTS

| | | | |
|---|---|---|---|
| 5,194,003 A * | 3/1993 | Garay | A61J 7/0092 |
| | | | 433/215 |
| 5,460,527 A | 10/1995 | Kittelsen | |
| 5,636,985 A * | 6/1997 | Simmen | A61C 9/0006 |
| | | | 433/37 |
| 6,030,213 A | 2/2000 | Trop | |
| 6,247,930 B1 | 6/2001 | Chiang | |
| 7,056,118 B2 | 6/2006 | Allred | |
| 7,328,706 B2 | 2/2008 | Bardach | |
| 8,113,837 B2 * | 2/2012 | Zegarelli | A61C 19/08 |
| | | | 433/215 |
| 8,591,229 B2 | 11/2013 | Keller | |
| 8,978,659 B2 | 3/2015 | Bardach | |
| 10,064,703 B1 | 9/2018 | Sanders | |
| 10,271,922 B2 | 4/2019 | Heymann et al. | |
| 2004/0005277 A1 * | 1/2004 | Willison | A61C 19/063 |
| | | | 424/53 |
| 2004/0103905 A1 * | 6/2004 | Farrell | A63B 71/085 |
| | | | 128/861 |
| 2010/0028829 A1 | 2/2010 | Lewis et al. | |
| 2012/0202168 A1 * | 8/2012 | Raghuprasad | A61C 19/063 |
| | | | 433/80 |
| 2012/0202172 A1 * | 8/2012 | Raghuprasad | A61C 19/063 |
| | | | 433/217.1 |
| 2013/0090627 A1 * | 4/2013 | Raghuprasad | A61J 7/0092 |
| | | | 604/514 |
| 2013/0871157 | 4/2013 | Hawkins | |
| 2014/0238417 A1 * | 8/2014 | Turkbas | A61C 19/063 |
| | | | 128/861 |
| 2015/0157434 A1 | 6/2015 | Bardach | |
| 2021/0000579 A1 * | 1/2021 | Higdon | A61M 5/3007 |

* cited by examiner

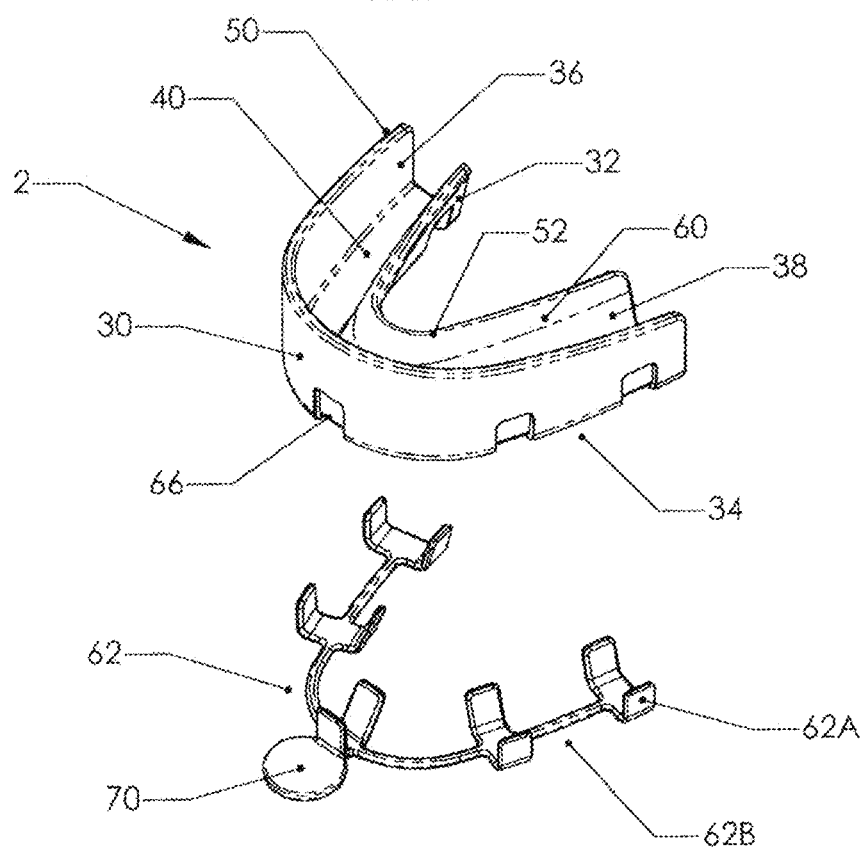

ORAL APPLICATOR DEVICE

RELATED APPLICATIONS

This application derives priority from New Zealand patent application number 762564 filed 12 Mar. 2020 incorporated herein by reference.

TECHNICAL FIELD

Broadly described herein is an intraoral applicator device and related methods of use. More specifically, an intraoral applicator device is described that is configured to transfer medicament from the applicator to the gums of a patient. Use of the intraoral applicator device is also described.

BACKGROUND

Medicaments are widely used for various medical procedures. A common medicament used in medical procedures is a topically applied or injected local anaesthetic and when using such anaesthetics, it is important to administer a known dose to the patient to avoid over or under dosing. Further, for topically applied of injected local anaesthetics, it is important to administer the dose in an even manner about the area to be anaesthetised. Uneven dosing may result in localised sensitivity in low dose areas or extended numbness in over-dosed areas. Excess amounts of medicament may also lead to undesirable side effects or complications beyond extended numbness as well.

Reference is made hereafter to the medicament being a local anaesthetic for ease of description. However, it should be appreciated that other medicaments may also be applied using the same devices and methods.

Further, reference is made hereafter to delivery of local anaesthetic to the 'gums' of a patient for ease of description. The term 'gums' or grammatical variations thereof as used in this specification refer to the gingiva and cervical areas of the teeth being the area where the crown meets the tooth. Further, the term 'gums' specifically excludes the tongue and cheeks of the oral cavity.

Intraoral local anaesthetic treatments usually require the administration via either an injection, rubbing of anaesthetic topically, adhesive strips or in some cases, a spray. Each of these art methods has disadvantages.

The use of an injection to the gums is a common method of administration of anaesthetic for dental applications. Injections are accurate in terms of dosing and accurate in terms of where the dose is applied. Injections are however very site specific hence, multiple injections are needed to apply medicament to a wider area of the mouth meaning more time and expense. Injections to the gums are also widely disliked by patients—the insertion of an injection needle may in fact prevent or discourage a patient from the very treatment they require. Injection use also requires a degree of skill from the practitioner, may be costly, may require an extra degree of sterilisation and may have inherent special disposal requirements. Practitioners too prefer not to cause stress or unnecessary pain to their patients hence would prefer not to use an injection if other options were equally useful and of less stress to a patient.

Rubbing of local anaesthetic topically may be completed by the practitioner topically applying anaesthetic from a bulk amount to the patient's gums. This may be completed by, for example, transferring medicament to a cotton bud or cotton swab or roll from the bulk and topically rubbing the transferred anaesthetic onto the area of the gums to be numbed. This method of administration inherently may lead to variations in dose i.e. it is difficult to measure out how much anaesthetic is transferred from the bulk and difficult to evenly distribute the anaesthetic to the gums or other areas. This method of administration also requires care in keeping the bulk amount sterile and stable. The method is also prone to inadvertent application of anaesthetic to non-target areas leading to unnecessary numbing. Transfer to a swab or bud is also not best practice in terms of maintaining medical sterilisation standards as the extra handling may increase the risk of cross-infection.

Adhesive strips may be supplied with a known amount of local anaesthetic thereon which goes part way to addressing dosing and strips may be applied to a wider area than a single injection site. Adhesive strips however are not favoured since, within the mouth, fluids and uneven contours and the like prevent clean adhesion and hence transfer of anaesthetic. Strips may not adhere at all, or not adhere for sufficiently long, leading to uneven dosing or, in worst cases, no dosing. Strips that do not adhere or, not adhere for sufficiently long, may also slip and numb non-target parts of the patient. A further draw back of strips is that they may be difficult to apply to constricted areas like gums as the practitioner may need to at least temporarily hold the strips in place inside the patients mouth using their fingers causing patient discomfort.

Transfer trays may be used in dental practices however they have a variety of problems when used to apply anaesthetic to the gums. One issue is that patients' mouths and teeth are by nature never identical in shape and form. This means that a tray for one patient is seldom a perfect fit for another patient. As a result, bespoke or customised trays must be used for each patient (or at least a group of patients). Poor fit leads to uneven dosing, trays falling out of the patient's mouth during administration, trays causing pain to the patient if too small, use of special materials like memory foams to try and address the varied sizes, insertion of the tray into the patient's mouth may be awkward and uncomfortable, and application of an even force on the area to be administered may be difficult.

As may be appreciated, it may be useful to provide a device and method of administration that topically applies anaesthetic to the gums of a patient in a manner that avoids injections, provides an accurate dose to the target areas and is compliant with the patient's mouth and minimises patient discomfort or at least to provide the public with a choice.

Further aspects and advantages of the intraoral applicator device and related methods of use will become apparent from the ensuing description that is given by way of example only.

SUMMARY

An intraoral applicator device is described herein that is configured to transfer medicament from the applicator to the gums of a patient. Use of the intraoral applicator device is also described.

In a first aspect, there is provided an intraoral applicator device for delivering a medicament to the gums of a patient's oral cavity, the device comprising:
 a body with a shape and configuration that generally conforms with at least part of the shape of the teeth and gums of a patient's oral cavity, the body interior having a wall or walls that align with the sides of the teeth extending from the gums to the teeth top, so that, when fitted to a patient's oral cavity, the body interior wall or walls are configured to at least partly bear against at least part of the patient's gums about a teeth side or sides; and a holder portion, the holder portion comprising a frame, the frame being configured to clamp over the teeth about a region of the patient's oral cavity such that, when fitted to the patient's oral cavity, at least a part of the holder portion is configured to be held between the patient's teeth when the patient bites their jaws together, the holder portion also gripping at least part of the body; and, wherein the holder portion when fitted to a patient's oral cavity either:

directly bears against the side or sides of the patient's teeth or a part of the patients teeth; or indirectly bears on the body wall or walls, urging at least part of the body wall or walls to bear against the side or sides of the patient's teeth.

In a second aspect, there is provided a method of delivering a medicament to at least a portion of the gums of a patient in need thereof by the steps comprising:

providing a device substantially as described above;

optionally apply medicament to at least part of an inside wall of the body;

shaping the body of device to match the outward shape of the jaw of the patient; and slide the body into the patient's mouth to partly enclose the patient's teeth and locate the body such that an inner surface of an upper portion of outer wall and/or inner wall, abut the gums abut a bottom of the teeth; apply the holder to the body; and leave the device in place for sufficient time to ensure transfer and activity of the medicament to the gums; or apply the holder to the body; slide the body into the patient's mouth to partly enclose the patient's teeth and locate the body such that an inner surface of an upper portion of outer wall and/or inner wall, abut the gums abut a bottom of the teeth; and leave the device in place for sufficient time to ensure transfer and activity of the medicament to the gums.

In a third aspect, there is provided a method of delivering a medicament to at least a portion of the gums of a patient in need thereof by the steps comprising:

providing a device substantially as described above;

optionally apply medicament to at least part of an inside wall of the body;

shaping the body of device to match the outward shape of the jaw of the patient; and slide the body and holder into the patient's mouth to partly enclose the patient's teeth and locate the body such that an inner surface of an upper portion of outer wall and/or inner wall, bear on the gums and bottom of the teeth; and leave the device in place for sufficient time to ensure transfer and activity of the medicament to the gums.

Selected advantages of the above include one or more of the following:

enablement of accurate dosing of a medicament enablement of even dosing of a medicament selective dosing of gums and not other parts of the oral cavity avoidance of an injection easy administration of a medicament minimises device and medicament handling minimises risk of cross contamination no adhesive needed size and proportions minimise patient discomfort relatively low cost and no need for customisation to individual patients versatility and wide range of uses.

DETAILED DESCRIPTION

As noted above, an intraoral applicator device is described herein that is configured to transfer medicament from the applicator to the gums of a patient. Use of the intraoral applicator device is also described. The device and methods of use may assist in topically applying medicament e.g. a topical anaesthetic to the gums of a patient without the need for or use of needles or syringes.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

Reference is made hereafter to the medicament being a local anaesthetic for ease of description. However, it should be appreciated that other medicaments may also be applied using the same devices and methods.

The term 'oral cavity' and grammatical variations thereof refers to a typical mouth comprising a jaw made up of an opposing mandible and maxilla side with teeth and gums whereby there are two opposing side jaw portions and a front jaw portion forming a substantially U shape oriented substantially in a first plane. The teeth and gums comprise an outer side facing away from the throat and an inner side facing the throat.

The term 'mouth' and 'oral cavity' may be used interchangeably herein.

As noted above, reference is made hereafter to delivery of local anaesthetic to the 'gums' of a patient for ease of description. The term 'gums' or grammatical variations thereof as used in this specification refer to the gingiva and cervical areas of the teeth being the area where the crown meets the tooth. Further, the term 'gums' specifically excludes the tongue and cheeks of the oral cavity.

The term 'teeth' or grammatical variations thereof refers to teeth located on the maxilla and/or mandible side of patients jaw.

The term 'patient' or grammatical variations thereof as used herein generally refers to a person requiring or desiring application of medicament to the gums. The patient may alternatively be an animal and the device used for veterinary applications. Reference to the term 'patient' or 'person' herein should not be seen as limiting to either human or veterinary use and the device may be adapted to suit either application.

Intraoral Applicator

In a first aspect, there is provided an intraoral applicator device for delivering a medicament to the gums of a patient's oral cavity, the device comprising:

a body with a shape and configuration that generally conforms with at least part of the shape of the teeth and gums of a patient's oral cavity, the body interior having a wall or walls that align with the sides of the teeth extending from the gums to the teeth top, so that, when fitted to a patient's oral cavity, the body interior wall or walls are configured to at least partly bear against at least part of the patient's gums about a teeth side or sides; and a holder portion, the holder portion comprising a frame, the frame being configured to clamp over the teeth about a region of the patient's oral cavity such that, when fitted to the patient's oral cavity, at least a part of the holder portion is configured to be held between the patient's teeth when the patient bites their jaws together, the holder portion also gripping at least part of the body; and, wherein the holder portion when fitted to a patient's oral cavity either:
  directly bears against the side or sides of the patient's teeth or a part of the patients teeth; or
  indirectly bears on the body wall or walls, urging at least part of the body wall or walls to bear against the side or sides of the patient's teeth.

Separate or Integrated

The body may be separate to the holder portion and the body and holder portion are configured to link together.

In an alternative embodiment, the body and holder portion may be one part.

Fit Location

The device may fit to at least one of the teeth located in the patients mandible.

Alternatively, the device may fit to at least one of the teeth located in the patients maxilla.

Double sided devices may also be produced to fit a mandible and maxilla however this may not be desirable for handling as the device size may increase to a point that creates patient discomfort.

Snug Fit

The body interior may at least partly snug fit directly or indirectly to the teeth and simultaneously at least partly snug fit a portion of the body interior to the gums of the patient's mouth when fitted.

Body Structure

The body in one embodiment may comprise:
  an outer wall, the interior of which when fitted faces the outside of a patient's teeth and gums; or an inner wall the interior of which when fitted faces the inside of a patient's teeth and gums; and
  wherein the holder supports the inner or outer wall of the body in a position that aligns the inner or outer wall of the body with the outside or inside of the person's teeth and gums when fitted to the patient's mouth.

Alternatively, the body may comprise:
  an outer wall the interior of which when fitted faces the outside of a patient's teeth and gums; or an inner wall the interior of which when fitted faces the inside of a patient's teeth and gums; and a base wall, the base wall being linked to the outer wall or inner wall and, when fitted in a patient's mouth, aligning generally over the patient's teeth; and
  wherein the holder supports the inner or outer wall and base wall of the body in a position that aligns the inner or outer wall of the body with the outside or inside of the patient's teeth and gums when fitted to the patient's mouth.

In a further alternative, the body may comprise:
  an outer wall the interior of which when fitted faces the outside of a patient's teeth and gums; and an inner wall the interior of which when fitted faces the inside of a patient's teeth and gums; and a base wall, the base wall being linked to the outer wall and inner wall and, when fitted in a patient's mouth, the base wall aligning generally over the patient's teeth; and
  wherein the holder supports the inner wall, outer wall and base wall of the body in a position that aligns the inner wall and outer wall of the body with the outside or inside of the patient's teeth and gums when fitted to the patient's mouth.

Body and Holder Shape—First Plane

The body and holder may be generally U-shaped in a first plane.

In an alternative embodiment, the body and holder may be generally elongated and J-shaped in a first plane.

In a further embodiment, the body and holder may be generally elongated and straight in a first plane.

The first plane referred to may be a substantially horizontal plane equivalent to the position of a patient's jaw position when the patient is standing. That is, the U-shape ends or J-shape end extends towards the patient's molars or back teeth while the U-shape or J-shape base lies about the front teeth when the device is fitted to a patient.

Further, as may be appreciated, the terms 'U-shaped' or 'J-shaped' or grammatical variations thereof are used to loosely describe the shape as having two arms connected to base. The shape might be more V shaped or L-shaped and the base may not be curved or the arms may not be entirely straight and the arms may be bent or curved.

Body and Holder Shape—Second Plane

The body and holder may be generally U-shaped in a second plane.

In an alternative embodiment, the body and holder may be generally J-shaped in a second plane.

In a further embodiment, the body and holder may be generally elongated and straight in a second plane.

The second plane referred to may be a substantially vertical plane equivalent to the position of a patient's jaw position when the patient is standing. That is, the U shape or J-shape is a form best seen in cross-section with the U-shape ends or J-shape end extending towards the patient's gums while the U shape or J-shape base lies about the top of the teeth when the device is fitted to a patient.

Further, as noted above with respect to the first plane, the terms 'U-shaped' or 'J-shaped' or grammatical variations thereof are used to loosely describe the shape as having two arms connected to base. The shape might be more V shaped or L-shaped and the base may not be curved or the arms may not be entirely straight and the arms may be bent or curved.

Medicament Region

An upper portion of the inner surface or surfaces of the body may be configured to receive medicament and transfer medicament to gums when fitted.

The area to which the medication may be placed may have a texture that provides a higher friction surface to hold medication thereon.

In one embodiment, the area to which the medication is placed may have a roughened surface.

In one embodiment, the roughened surface may have a cross moulded texture.

Surface variations such as those described above may act to retain medicament on the device during transfer. The surface variations may also improve or cause the device to be better able to grip the teeth and bear on the gums. The surface variations may take the form of: depressions, grooves, notches, slots, apertures, ribs, fins, steps in thickness, and combinations thereof.

Medicament

Medicament may be applied to the device or a part thereof at a sufficient level or concentration to provide a therapeutically effective dose.

Medicament may be in a form that allows it to be applied to the device and to topically transfer to the gums of a patient. Examples of suitable forms may include: liquids, lotions, ointments, creams, foams, solid or semi solid forms, gels, powders, and combinations thereof.

Holder Frame and Spine

The holder may comprise a frame with a spine, the spine following a line generally coincident with the teeth and at least one rib extending generally orthogonally from the spine that link to and are configured to urge the body or a part thereof against the teeth of the patient.

The at least one rib may have an elongate shape curved or angled to form a shape commensurate with the outward shape of the lower portion of the wall or walls of the body.

The outer wall or walls of the body may comprise at least one opening and wherein at least part or all of the frame spine and at least one rib nests into and is/are captured in the opening.

The opening(s) may be complementary in size with the frame spine or at least one rib and the frame or a part thereof fits into the complementary opening or openings.

The frame or a part thereof may fit into the complementary opening or openings and may be retained within mechanically, by ultrasonic welding, by adhesive, and by combinations thereof.

By way of example, the frame or a part thereof may:

snap fit into the complementary opening or openings; or mate with at least one complementary hook/barb on the body and/or frame; or slide over a non-return detail or clip, stud or a hole on the body; or be over moulded onto the body.

Wall Height

In one embodiment of the intra-oral applicator device:

the body may comprise a U-shape in a first plane, an outer wall, an inner wall and a base wall, the body walls extending from a front linking body base as body arms so that, when fitted, the body base extends across the patient's front teeth and the body arms extend across the rear teeth of the patient (the molars), the region between the body arms defining a body space and;

wherein the outer wall has a height that varies from the body base to an end of the body arms and the inner wall has a height that is constant.

In the above embodiment, the base of the outer wall may be non-sloping and level.

The outer wall may be vertically orientated and the inner wall may be sloped towards the body space.

The height of the walls and holder portion, may be similar or different or be varying sloping or curved and there can be gaps and or apertures in the walls which do not need to be continuous. The thickness of the walls and holder portion may also be uniform, the same or different or graduating.

Wall Angle

The angle between the outer wall and the inner wall with respect to each other may vary dependent on the position in the mouth where the angle behind the front teeth is different to the angle adjacent to the side teeth. There may be variations where the body has only an outer wall and a base wall or an inner wall and a base wall (L shape) or where the body has no base wall and the outer and inner walls are supported by the holding element. There may also be variations where the device has only one arm, being half a U shape in a first plane (J shape), and the device may be provided with a left hand and a right hand component, which may have the advantage of fitting a wider range of jaw sizes.

Handle

A handle may extend outwardly from the holder or body.

Varied Resilience

In one embodiment, an upper portion of the outer wall and/or inner wall of the body may be configured to be more resilient softer than a lower portion outer wall and/or inner wall so as to enable the upper portion of the outer wall and/or inner wall of the body to comply with the surface shape of the gums of the patient's mouth when the device is fitted to the patient's teeth and gums.

Material and Form

In one option the material of the device can be formed of any suitable material that allows manipulation as a memory type material which can allow shaping to better match the teeth and gums of a particular mouth. In yet other options there might be hinging (e.g. separate hinge or living hinge etc) between the outer wall and base wall and or between the inner wall and base wall.

In one embodiment, the body may be fabricated from silicone. In an alternative embodiment, materials such as polypropylene of foams may be used.

In one embodiment, a lower portion of the body may be thicker than an upper portion.

In one embodiment, the outer wall may be designed to be more rigid than the inner wall to better enable a lower portion of the walls to side clamp the teeth with or without holder portion and an upper portion to touch or apply the medicament to the gums. The reinforcement could hold the device to the teeth directly so that the reinforcement is in contact with the teeth or indirectly where the reinforcement holds the body against the teeth.

In another embodiment, the outer wall and inner wall may be similar in flexibility and the base wall could be either more flexible, less flexible or the same as the other walls.

In a further embodiment, the inner wall may be more flexible than the outer wall because the curved shape of the inner wall will create more rigidity.

In one embodiment, the outer wall and/or inner wall may be manufactured from a common material.

An upper portion of the inner surface of the wall may include a first additive to create a more flexible area.

A lower portion of the inner surface of the wall may include a second additive to create a more rigid area.

The holder may be manufactured from a material that is resilient and which may be shaped and which may retain its shape once moulded.

In one embodiment, one wall e.g. an outer wall or inner wall may be formed of a rigid material such as injection moulded polypropylene plastic and the other wall may be formed from a more flexible material such as EVA foam. Co-moulding techniques may be used to form these walls having different material types either as in each wall or as part of each wall.

The materials (plastics, foams silicone etc) selected for any of the walls of the device can be varied to suit flexibility requirements, fitting and holding requirements and the need to adequately abut or contact a surface of the gums. There are a multitude of possibilities which can be combined with any of the other features of the walls such as the surface or thickness variations. In another variation for the medicament where a gel can be used it can be held on a cotton wad attached to the surface of the body which is where the body is not directly in contact with the soft tissue.

Method of Delivery—Two Part Applicator

In a second aspect, there is provided a method of delivering a medicament to at least a portion of the gums of a patient in need thereof by the steps comprising:
   providing a device substantially as described above;
   optionally apply medicament to at least part of an inside wall of the body;
   shaping the body of device to match the outward shape of the jaw of the patient; and
      slide the body into the patient's mouth to partly enclose the patient's teeth and locate the body such that an inner surface of an upper portion of outer wall and/or inner wall, abut the gums abut a bottom of the teeth; apply the holder to the body; and leave the device in place for sufficient time to ensure transfer and activity of the medicament to the gums; or
      apply the holder to the body; slide the body into the patient's mouth to partly enclose the patient's teeth and locate the body such that an inner surface of an upper portion of outer wall and/or inner wall, abut the gums abut a bottom of the teeth; and leave the device in place for sufficient time to ensure transfer and activity of the medicament to the gums.

Method of Delivery—Integrated Applicator

In a third aspect, there is provided a method of delivering a medicament to at least a portion of the gums of a patient in need thereof by the steps comprising:
   providing a device substantially as described above;
   optionally apply medicament to at least part of an inside wall of the body;
   shaping the body of device to match the outward shape of the jaw of the patient; and
   slide the body and holder into the patient's mouth to partly enclose the patient's teeth and locate the body such that an inner surface of an upper portion of outer wall and/or inner wall, bear on the gums and bottom of the teeth; and
      leave the device in place for sufficient time to ensure transfer and activity of the medicament to the gums.

Pressure Application

In one embodiment, once fitted, the holder or a part thereof may be squeezed to apply pressure onto the body and teeth to cause the lower portion of the wall or walls to clamp the body to the teeth.

Optionally, the holder ribs may retain their squeezed position by material memory.

The holder ribs may in one embodiment be manufactured from a U shaped strip of a metal or alloy. The metal may be aluminium although many other materials may be used with similar properties of shape memory and resilience.

Alternatively, the holder ribs may be retained in a squeezed position via an adjustable ratchet clip. Cable tie ratchet clips provide one example mechanism of how this method may work.

Advantages

Advantages of the above include one or more of the following:
   enablement of accurate dosing of a medicament
   minimises waste or excess use of medicament
   enablement of even dosing of a medicament to all areas by one action
   enablement of delivery a low dose of topical anaesthetic directly to a target area and not to non-target areas.
   selective dosing of gums and not other parts of the oral cavity
   avoidance of an injection
   avoidance/minimisation of pain and discomfort to a patient
   easy administration of a medicament and non-invasive
   through greater ease of use/speed of application, the device frees up time available to practitioners treating patients
   minimises device and medicament handling
   minimises risk of cross contamination
   no adhesive needed
   size and proportions minimise patient discomfort
   relatively low cost and no need for customisation to individual patients
   versatility and wide range of uses
   easy to manufacture
   the device may be manufactured to be disposable post use or it may be sterilised and re-used depending on manufacturer requirements The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as if individually set forth.

BRIEF DESCRIPTION OF THE DRAWINGS

Further aspects of the intraoral applicator device and related methods of use will become apparent from the following working examples that are given by way of example only and with reference to the accompanying drawings in which:

FIG. 12 illustrates an upper perspective view of the body of the device first embodiment;

FIG. 13 illustrates an upper perspective view of the holder portion of the device first embodiment;

WORKING EXAMPLES

Figure 1:
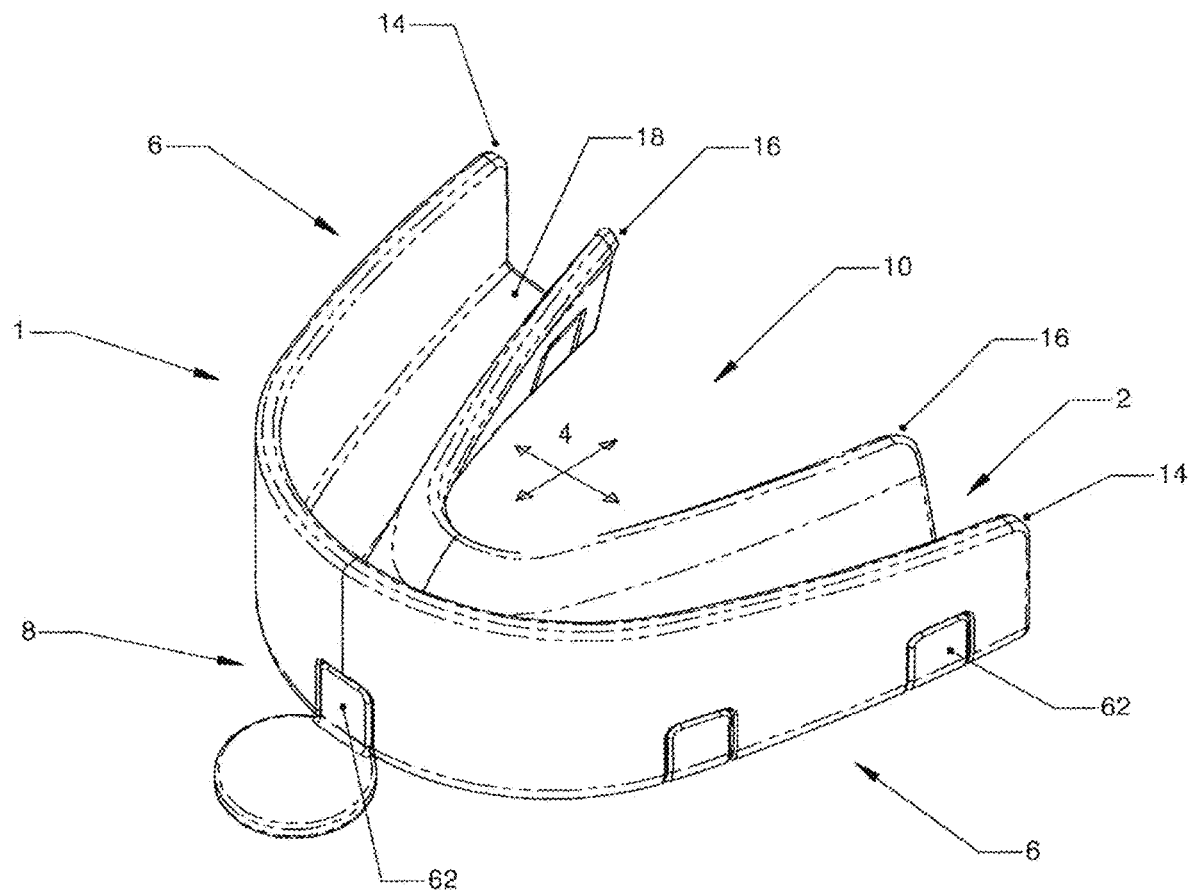
FIG. 1 illustrates an upper perspective view of the intraoral applicator device (device) of a first embodiment without a handle or contour lines.
Figure 2:
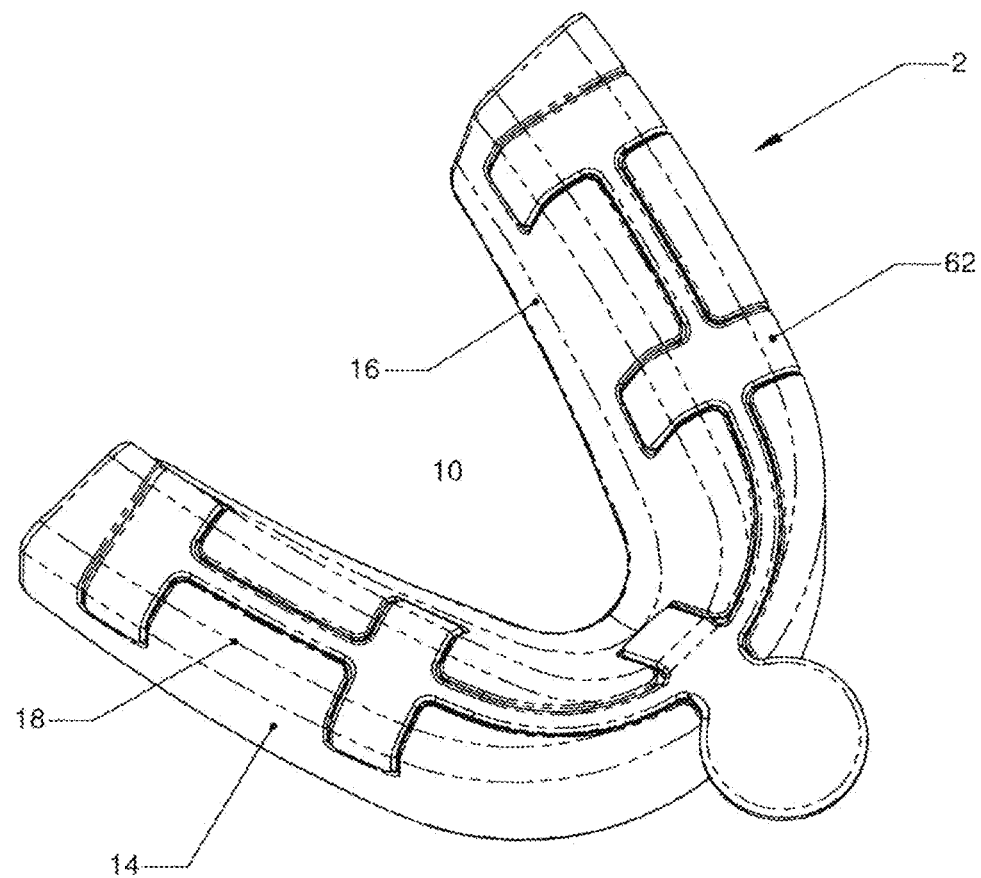
FIG. 2 illustrates a lower perspective view of the device first embodiment without a handle or contour lines.
Figure 3:
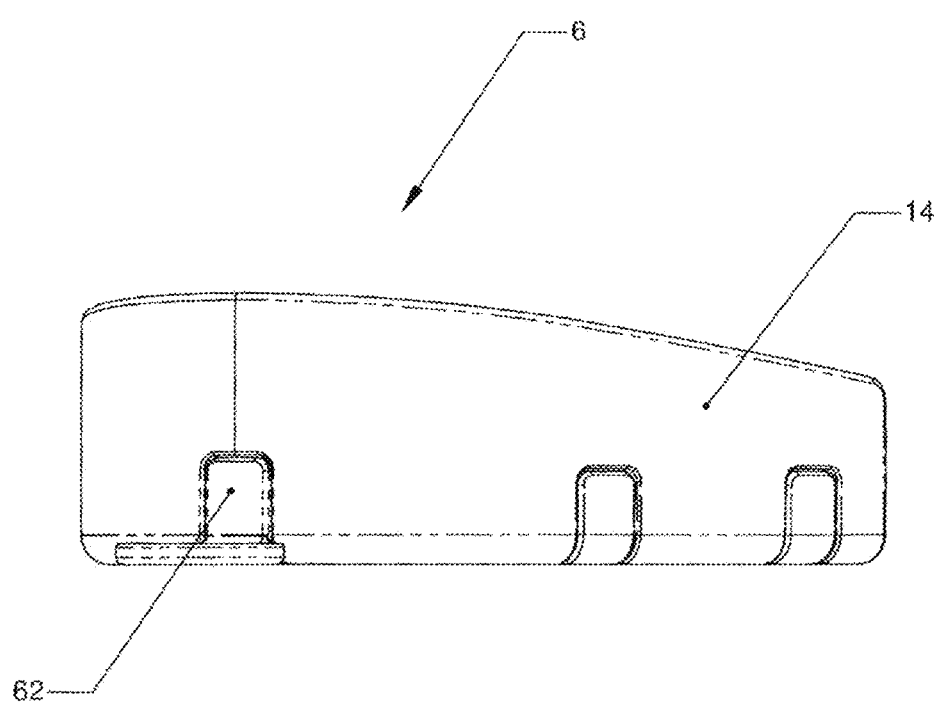
FIG. 3 illustrates a side view of the device first embodiment without a handle or contour lines.
Figure 4:
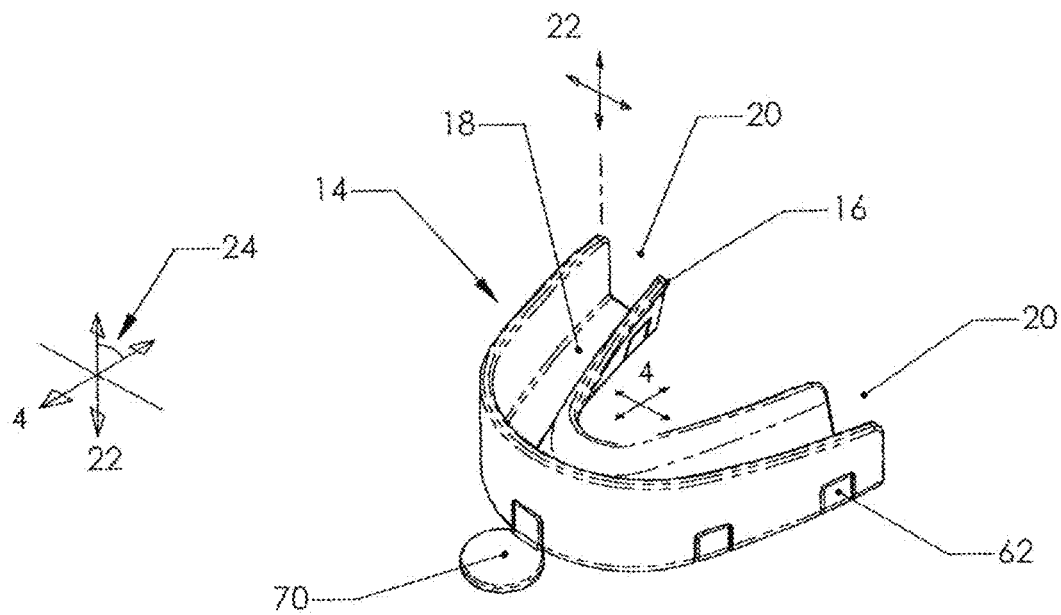
FIG. 4 illustrates an upper perspective view of the device first embodiment assembled oral applicator device.
Figure 5:
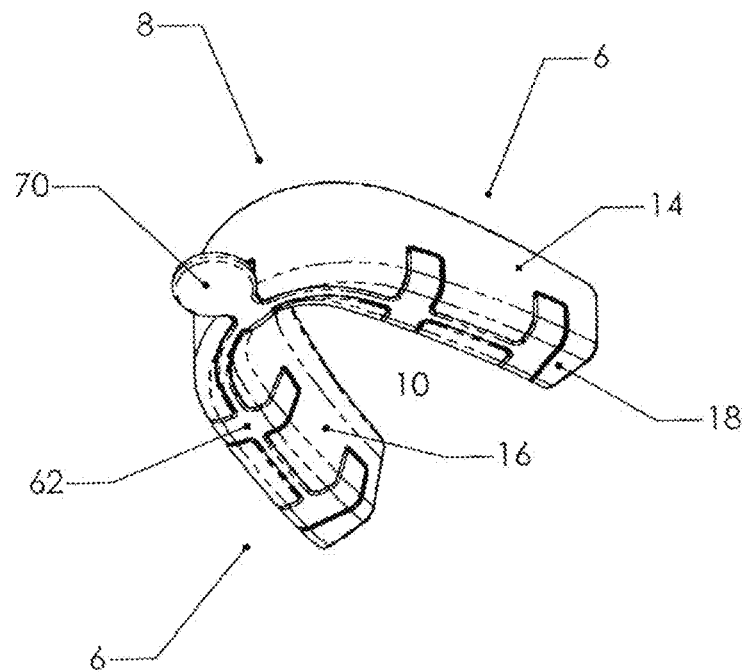
FIG. 5 illustrates a bottom perspective view of the device first embodiment assembled oral applicator device.
Figure 6:
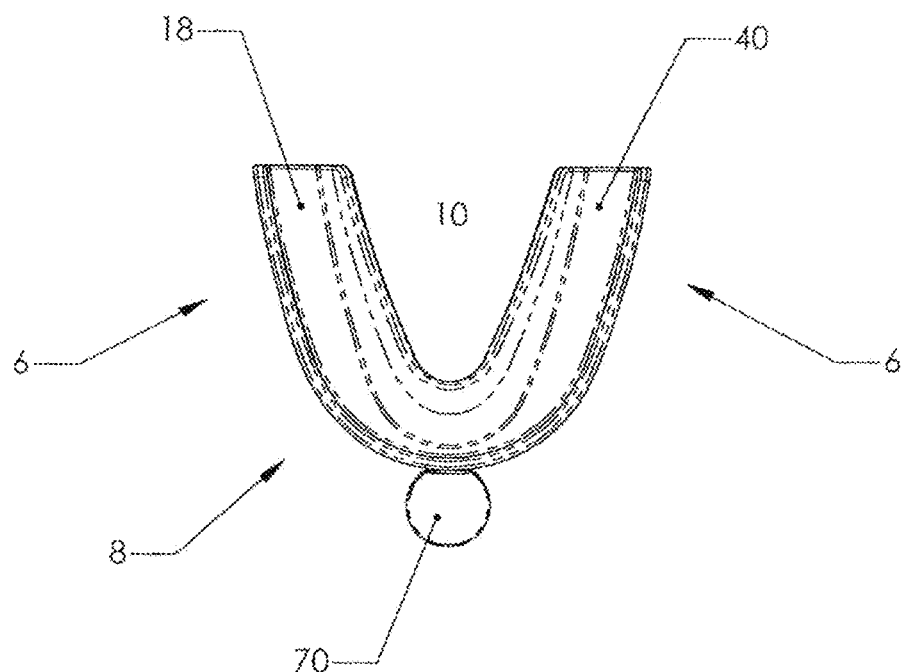
FIG. 6 illustrates a top plan view of the device first embodiment assembled oral applicator device.
Figure 7:
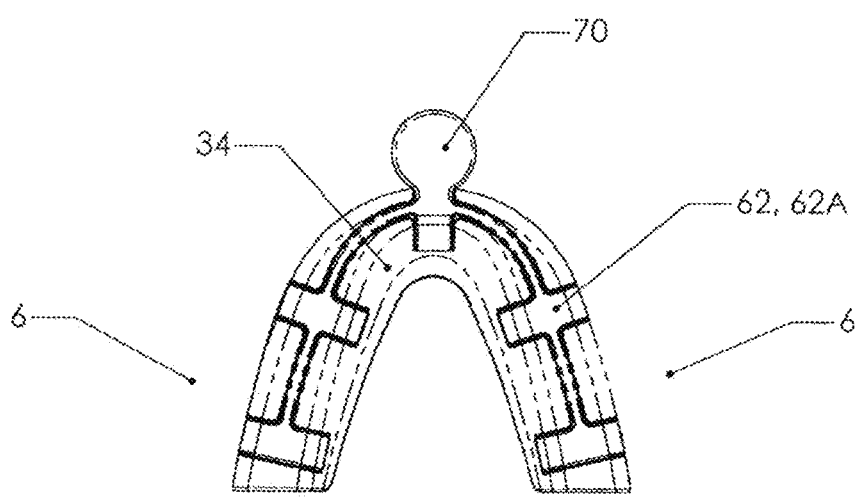
FIG. 7 illustrates a bottom plan view of the device first embodiment assembled oral applicator device.
Figure 8:
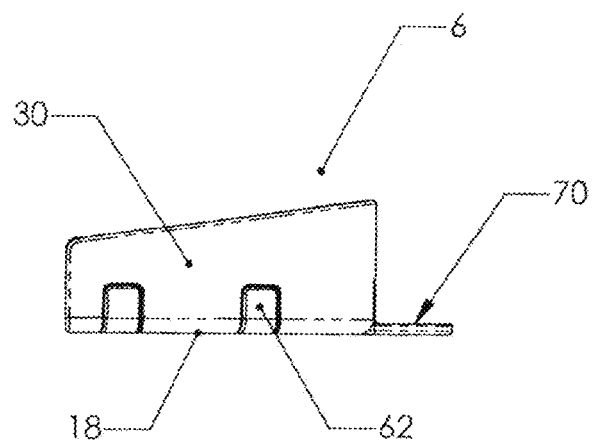
FIG. 8 illustrates a left side view of the device first embodiment assembled oral applicator device.
Figure 9:
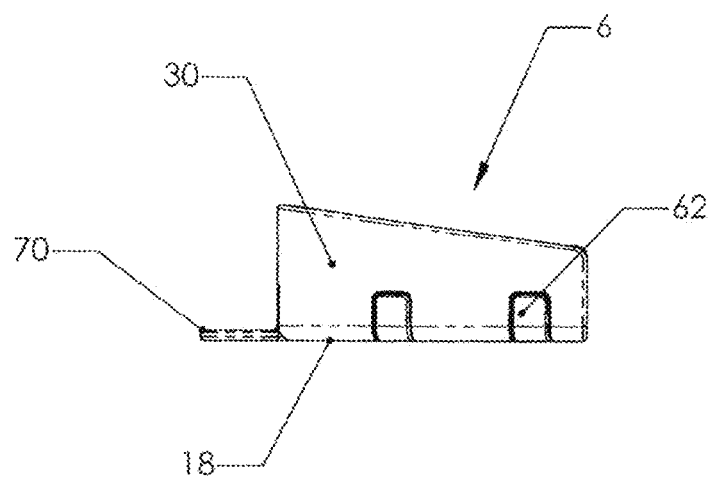
FIG. 9 illustrates a right side view of the device first embodiment assembled oral applicator device.
Figure 10:
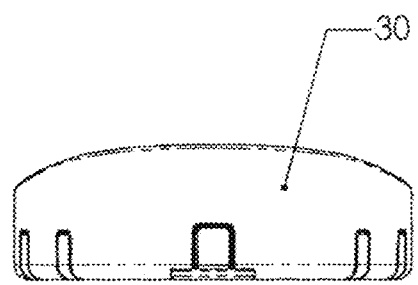
FIG. 10 illustrates a front view of the device first embodiment assembled oral applicator device.
Figure 11:
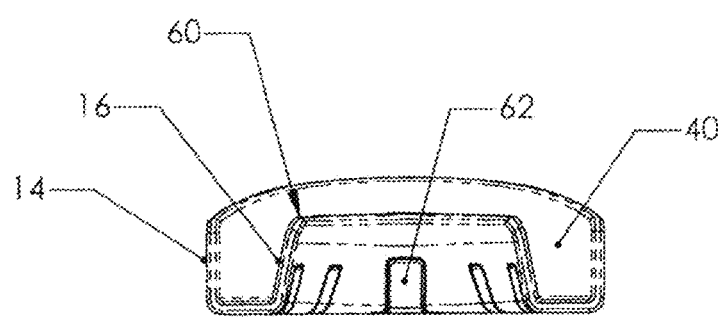
FIG. 11 illustrates a rear view of the device first embodiment assembled oral applicator device.

The above described intraoral applicator device and related methods of use are now described by reference to specific examples.

Example 1

In this example, a first embodiment of device is described with reference FIGS. 1-13.

As shown in the Figures, an intraoral applicator device 1 has a body 2 formed in a substantially or similar shape to a U, V or square U shape or channel shape which is said to lie in a first plane 4.

Body 2 includes body arm(s) 6, a body base end 8 and body space 10 there between. Overall the U, or V or channel shape is shaped or formed to be at least similar to the outward and/or inward shape of at least some of the teeth and/or gums of at least one side jaw portion of a patient to be medicated. Each body arm(s) 6 is an elongate member portion formed with the body base 8 in between and connected or formed with.

The body arm(s) 6 and body base 8 in this embodiment, each comprise in cross section a channel section being contiguous with each other being spatially connected together as twin walls and base, with each being made up of, in cross section, at least one outer wall 14 facing outwardly when in use in a mouth and at least one inner wall 16 facing when in use the inside the mouth, separated at one end by a base member 18 with an internal channel space 20 therein. The outer wall 14 is any suitable shape to fit or abut/touch the teeth and gums e.g. curved in shape being oriented as an upright member not necessarily being parallel with the inner wall 16 also being oriented as an upright member. The outer wall 14 and inner wall 16 are oriented in a second plane 22 substantially at a first angle 24 to the first plane 4 occupied by the body 2 of the device 1 such that the inner and outer walls 14, 16 can, when in use, abut and bear on a surface of the teeth. For example, first angle 24 can be approximately or near to 90 degrees to an angle of the first plane 4.

The outer wall 14 has a first outer face surface 30 facing, when in use, outwardly of a mouth and, inner wall 16 has a second outer face surface 32 facing the mouth when in use. Base wall 18 has third outer face surface 34. Outer wall 14 also has a first inner channel surface 36 and inner wall 16 has a second inner channel surface 38. Base member 18 also has a third inner channel surface 40. First inner channel surface 36 faces second inner channel surface 38 and third channel surface 40 which provide a continuous border surface for the channel space 20.

The outer wall 14 is spaced from the inner wall 16 by a dimension parallel with the first plane 4, by wall to wall internal width dimension 42. The outer wall 14 has a first thickness dimension 44, inner wall 16 has a thickness dimension 46, and base wall 18 has a third thickness dimension 48.

Outer wall 14 comprises a planar member having a first top end edge surface 50 and, inner wall 16 has a second top edge surface 52. Outer wall 14 has an in use first height dimension 54 taken from the base wall 18 to the first top end edge 50 and inner wall 16 has a second height dimension 56 also taken from its own second top end edge 52 to the base wall 18. Height 54 is selected to be similar, smaller or greater than height 56. Base wall 18 has a width dimension 58 oriented parallel within the first plane 4.

As shown in FIGS. 1-13, the outer wall 14 has a height that varies from the body base 6 to an end of the body arms 8 and the inner wall 18 has a height that is constant, wherein the base of the outer wall 14 is non-sloping and level, the outer wall is vertically oriented and inner wall 16 is sloped towards body space 10. The top edge of the inner wall 16 is outwardly curved and the intersection between the inner wall 14 and base wall 18 and between the base wall 18 and the inner wall are rounded.

The device 1 is designed to be retained within the mouth by the device 1 at least gripping or holding the teeth and optionally the gums, to allow the medicament to be able to contact and be temporarily held against the gums. The material for the device 1 needs to be soft enough to contact the gums but strong enough to at least clamp the teeth and be of a material able to hold a medicament thereon or therein for application to the gums. It was found that the device 1 needs to clamp at least the teeth quite firmly to be retained to allow the medicament to be applied as required. It was also found that the device needs to clamp the teeth quite firmly to be retained.

The device has features that enable the device 1 to grip, hold or better grip at least the teeth which include at least one of the following features: mixed or different material types and shape differences including ribbing or steps and angles.

The outer wall 14 can be formed of a material different to the material type of the inner wall 16. Furthermore the material for the base wall 18 can be the same or different to the outer wall and/or the inner wall.

For example, one wall e.g. the outer wall 14 (or inner wall 16) can be formed of a rigid material such as injection moulded polypropylene plastic and the other wall, i.e. inner wall 16 (or outer wall 14) can be formed of more flexible material such as EVA foam. Co-moulding techniques can be used to form these walls having different material types either as in each wall or as part of each wall.

A holder portion 62 is an optional feature of the oral applicator device, which includes any suitable means in the form of a structure that is shaped and configure to hold the device 1 to at least some of the teeth.

In particular, holder portion 62 is a feature of the walls or applied to any or all of the walls 14, 16, 18 of the device 1 which assist in the clamping or holding action of the device (i.e. by causing the lower portion of the walls 14, 16 to clamp or grip better to the teeth or optionally more clamping at a lower portion of 14, 16 and less or graduated or stepped pressure as one goes upward of the walls 14, 16 so at the top to assist in allowing the medicament to just touch/bear on the gums).

The clamping includes an action whereby the holder portion is pre-stressed but formed of a material that allows the holder portion to resiliently deflect outwardly over the object (directly to the teeth or indirectly via a lower portion of the body) being clamped, to then deflect back to hold thereon around the teeth or some of the teeth. The holder portion has to be strong enough to hold, grip and capture the holder portion and body to at least the teeth or some teeth without hurting the patient. The holder portion also needs to be strong enough to allow the substance to be applied to the gums, also without hurting the patient. The holder portion further needs to be flexible or resilient enough to allow at least hand operation to grip the teeth and allow simple and easy removal from the teeth.

Holder portion 62 includes at least one protuberance e.g. rib or ribs, ridge(s) and steps 64 (best seen in FIGS. 16 and 17) or angles mounted or formed on any face of the outer surfaces 30, 32, 34 or inner surfaces 36, 38 and 40, of any of the walls 14, 16, 18, which can be separately or integrally formed with the body 2 or holder portion 62 can be a channel shaped member.

Figure 16:
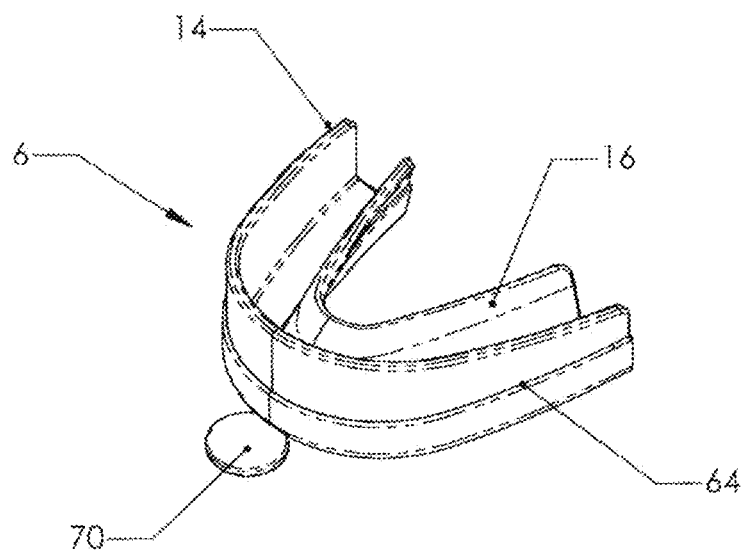
FIG. 16 illustrates an upper perspective view of a further embodiment of the oral applicator device, the device formed from one stepped piece without ribs.
Figure 17:
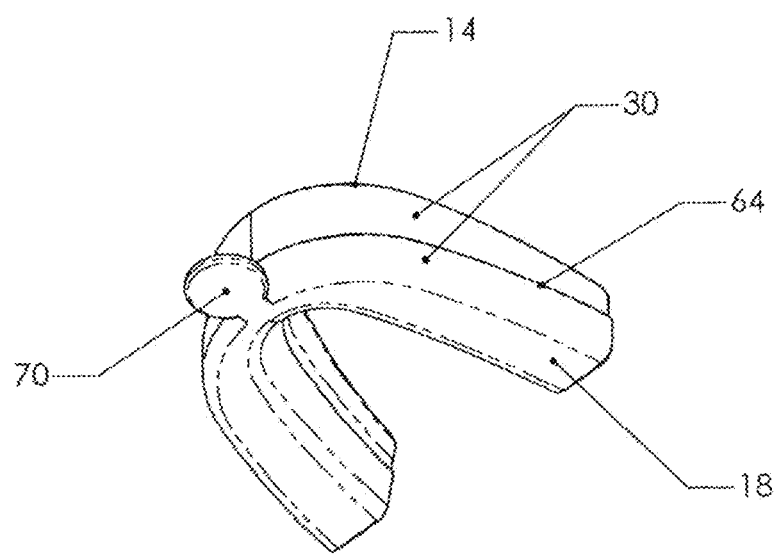
FIG. 17 illustrates a bottom perspective view of the device of the embodiment of FIG. 16.

Ribs 62 as shown in FIGS. 16 and 17 are formed as raised protuberances, either as separate members or joined members, which can be separately formed and applied to a lower portion of the outer surface of one or two of or any of the walls 14, 16 and to base wall 18 or can be integrally formed as part of a moulding or manufacturing process to make the device.

In this example, the ribs 62 are shaped as shaped elongate curved or angled planar members which can be rectangular and shaped to overlap or be similar in shape to the outer shape/surface of the outer wall 14, inner wall 16 and base wall 18.

The holder portion 62 also includes five spaced ribs 62 whereby two spaced ribs 62 are located on each body arm 6 and one rib 62 is located centrally on the body base between the body arms 6.

As shown in FIGS. 1-13, the rib(s) 62 are shown as being housed within optional complementary shaped slots 66 (see FIG. 12 particularly) within the outer surfaces 30, 32, 34 of a lower portion of outer and inner walls 14, 16 and of base wall 18. The recessed slots 66 help align the holder portion 62 with the body and also allow the holding to be flush or slightly recessed into the body 2 for a more comfortable fit in the mouth.

The holder portion 62 is shaped and configured to provide a holding or clamping of the walls 14, 16, 18 to at least the teeth, especially outer wall 14 and inner wall 16 or at least one of outer wall 14 or inner wall 16 whereby one of the walls 14 or 18 is caused by its structure or portion thereof to move or flex with respect to the other wall. For example, the outer wall 14 is formed to be more rigid than the inner wall 16 which is more flexible, thereby causing either the holding and clamping of a portion of the device 1 to the teeth and the transfer of the or part of the medicament e.g. a gel, to at least a portion of the immediately adjacent gums.

The holder portion 62 can be formed as discrete ribs 62 or be formed having a wall section of a continuous length e.g. a channel or a series of shorter lengths either joined together or not joined together. A series of shorter lengths would allow the device 1 to expand and contract to fit a variety of jaw sizes.

The holder portion 62 in another example best seen in FIG. 13 includes a continuous length form as a frame like member comprising U shaped curved or channel shaped ribs portions or is of separate U shaped protuberances 62A spaced and joined or connected along a central support spine 62B whereby that the holder portion 16 is shaped and configure to clamp the teeth either through a lower section of the body 2 or directly to the teeth themselves. The ribs 62A can have a greater width than the width of the spine 62B which is better required to exert pressure on the lower portion of the body 2 and gums when required to hold the device 1 in place.

The spine 62B being elongate having a main longitudinal axis is located parallel along the main longitudinal length of the base wall 18 and the ribs 62A being elongate in shape having a longitudinal axis, are located and oriented extending at right angles to the spine 62B to extend laterally across the width of the base wall and up the outer surfaces 30, 32 of outer wall 14 and inner wall 16. In this example, spine 62B has a width somewhat less than the width of the ribs 62A.

At least one handle 70 is also shown. A handle 70 is not essential, but can be useful in assisting in the handling of the device without contaminating the medicament or device 1 especially as this device is being put in the mouth of patient and to allow better fitting to the teeth and gums and to ease removal.

The handle 70 is usually shaped as a planar tab like member attached to the outer wall 14 though it can be attached formed with the holder portion or base wall 18 or even the inner wall 16.

In general the device described herein is shaped and configured to enable a medicament from an upper portion of the outer and inner walls 14, 16 to be topically applied to a surface of at least the gums which requires at least a lower portion of the device 1 to be able to clamp or hold the device to at least the teeth.

The holder portion 62 is therefore located at a lower end of the body 2 of the device 1 to assist in and/or cause clamping of a portion of the body 2 to the teeth. In this example the holder portion is located on an outside of a lower portion of the outer 14 and inner walls 16 and also underneath the base wall 18.

Depending on the material being used for the device 1, in one option, the body 2 could be formed to better match the jaw shape but most likely, in another option, the material will have a memory and return to the original shape. The design however allows the device 1 to flex and still hold to accommodate a range of jaw shapes and sizes.

The body 2 or part of the body 2 is designed to be more flexible than the holder portion 62 as part of the body when in use contacts the gums. Medicament e.g. an anaesthetic is applied to an inner surface(s) of the body that then contacts the soft tissue or gums.

The body 2 walls 14, 16 and second wall could be the same material where the wall thickness creates the difference in flexibility.

Alternatively, the body 2 and holder portion 62 can be formed of the same material where the body 2 has an additive such as a foaming chemical to create a more flexible area or the holder portion 62 includes a material with an additive to create a more rigid area.

Alternatively the body 2 and holder portion 62 could be formed of different materials either produced together in a process such as double shot injection moulding, overmoulding and insert moulding or the two walls could be formed of separate parts that are joined together mechanically, or ultrasonic welded or glued.

The shape of the device 1 or body 2 and holder portion 62 can be shaped as a full curve that contacts all the teeth in the upper or lower jaw (maxilla or mandible). Alternatively the device 1 could be a part curve e.g. J-shape that contacts only some of the teeth.

A first body 2 wall 14 or 16 could be in direct contact with the teeth and clamp against the teeth or the first wall 14 or 16 could clamp the second wall 14 or 16 against the teeth The positional height 54, 56 of the outer wall 14 and inner wall 16 of body 2 is set by the depth of U or channel shape such that the device is held in the correct position with the anaesthetic contacting the gums when the patient closes their jaw and the base of the U is held against the horizontal surface of the tooth.

Yet other variations include having the holder portion 62 which can be formed as a separate one piece frame as seen in FIGS. 1-13 or the holder portion 62 can be integrally formed as part of the outer and inner walls 14, 16 and base wall 18 as raised protuberances or ribs 62B either as separate protuberances or connected continuous protuberances.

The walls 14, 16, 18 can be formed as separate components and connected or joined together. Furthermore, the connecting can be a hinge (not shown), the hinge provided between the walls 14, 16, 18.

The optional handle 70 may be formed as part of the ribs or be formed as part of the base wall 18 and comprising different shapes e.g. a ring, a tab, oval etc.

In yet another variation, a portion of the U-shaped body 2 could clamp, touch or abut directly against the gums or it could support another material, such as a soft cotton wad, and clamp the other material against the gums.

Outer wall 14 which has a first inner channel surface 36 and inner wall 16 which has a second inner channel surface 38 such that when in use they are configured to contact the soft tissue or gums, could be textured or shaped to hold the anaesthetic.

Other variations include having outer wall 14 and inner wall 16 but with no base wall 18 with the holder portion 62 joining, connecting (e.g. clipping in slots) to a lower portion or one end of the outer walls 14 and inner walls 16 i.e. in effect the holder portion 62 could replace the base wall 18.

The holder portion 62 is there to cause a clamping or holding action against the teeth while the body 2 which includes inner walls 14, outer walls 16 and optionally the base walls 18 are there to create contact between the medicament e.g. gel and the gums, where the holder portion 62 wall is in contact and connected with the body 2.

The handle 70 can shaped of any suitable shape that is able to be grabbed or held by a user. For example handle 70 it can be shaped as a ring, a tab, be round or square etc Example 2

In this example, a second embodiment of device 1 is described with reference to FIGS. 14-15.

In this embodiment, the device 1 comprises a U-shaped body 2 having arms 6 and body base end 8 in a first plane 4 and U shaped cross section in a second plane 22 at least one inner wall 14, at least one outer wall 16 and base wall 18) with separate or integral holder portion 62.

For the third option, the U shaped body extends around all sides of the jaw which includes an outer wall 14 and inner wall 16 joined to a base there between, and the holder portion 62 is formed of a frame member with U shaped ribs extending laterally therefrom a trunk portion wherein the holder portion is connected or formed to a lower end of the walls 14 or 16 abuts a low end of the base wall 18 to then extend behind the tooth opposite to the side the wall 14 or 16 is on.

Figure 14:
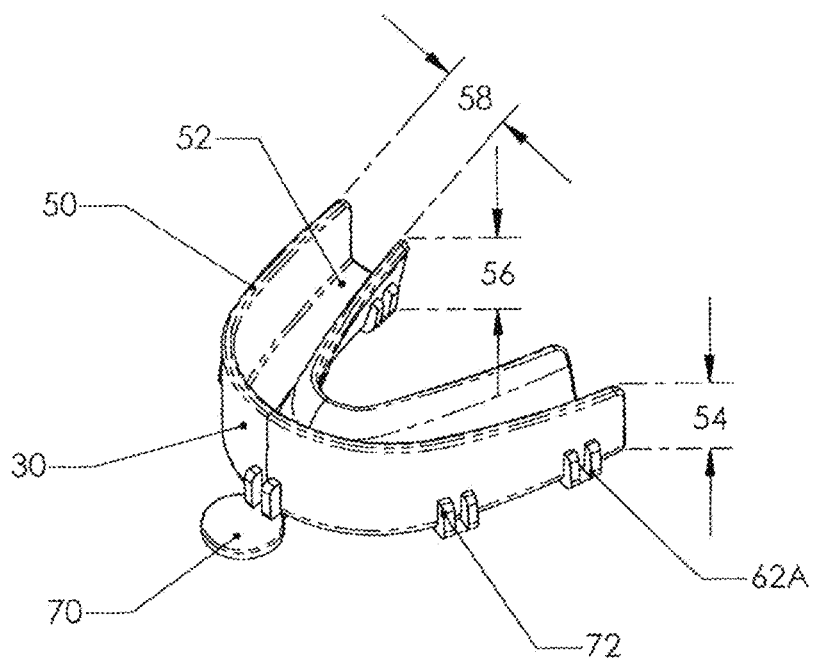
FIG. 14 illustrates an upper perspective view of a further embodiment of the oral applicator device, the device formed from one piece with formed ribs.

As shown in FIG. 14, the thickness of the walls of the outer wall 14, inner wall 16 and base wall 18 can be varied to affect and control the flexibility of each wall. The inner wall 16 can be shaped to be more curved 60 (as shown in FIGS. 14 and 15) than the outer wall 14 which can also affect how the inner wall 14 deflects or bends with respect to the outer wall and/or base wall 18 or vice versa, when being fitted to the teeth and gums.

The variation of the thickness can include contours, stepped, angled or recessed portions 64 to further assist in the actions of clamping and touching, to any face of the outer surfaces 30, 32, 34 or inner surfaces 36, 38 and 40, of any of the walls 14, 16, 18

In this example, having a thicker lower portion of the outer 14 and inner 16 walls assists in the clamping of the device to the teeth and a thinner upper section having more flexibility than the lower section helps in the need to touch the gums to apply the medicament or topical administration.

Figure 15:
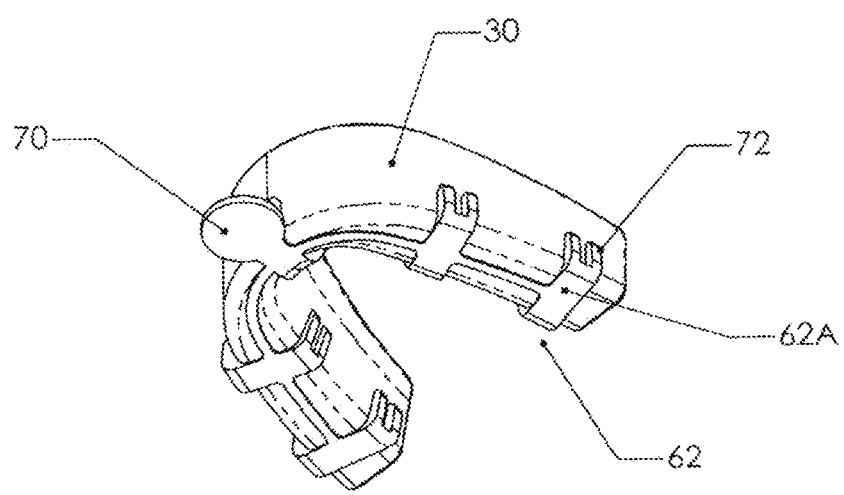
FIG. 15 illustrates a bottom perspective view of the device embodiment of FIG. 14.

Also as shown in FIGS. 14 and 15 the protuberances or ribs 62B can be formed as elongate U shaped member of generally rectangular shape with ends formed as fingers 72 which extend up the outer surface 30, 32 of outer and inner walls 14, 16

The one piece frame is shaped to be fitted to capture a lower outer portion of the outer wall 14, inner wall 16 and base wall 18 or optionally the one piece frame is shaped to removably inter-fit or clip into complementary slots along first outer face surface 30 of lower part of the outer walls 14, the second outer face 32 of the inner walls 16 and third outer face surface 34 of the base wall.

Example 3

FIGS. 16-17 shows a further embodiment. The ribs 62, instead of being discrete U shaped rib branches on a spine, can be formed as a continuous U-shaped member either slotting in underneath wall 18 and the lower part of the inner and outer walls 14, 16, or be attached simply to outer surfaces 30, 32, 34 of walls 14, 16, 18 to protrude therefrom. When the ribs 62 are located on slots, the ribs 62 can be sized to sit flush with outer surfaces 30, 32, 34 or can be sized to be protruding as required.

Example 4

Figure 18:
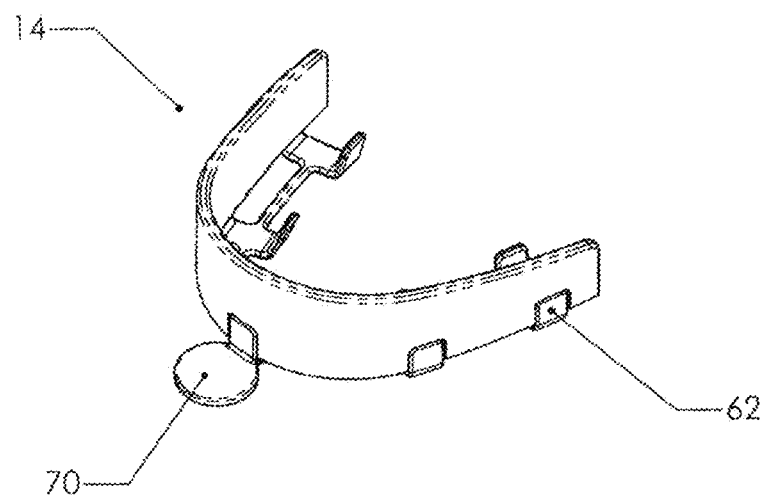
FIG. 18 illustrates an upper perspective view of a further embodiment of the oral applicator device, the device having an outer wall, no base wall and holder portion.
Figure 19:
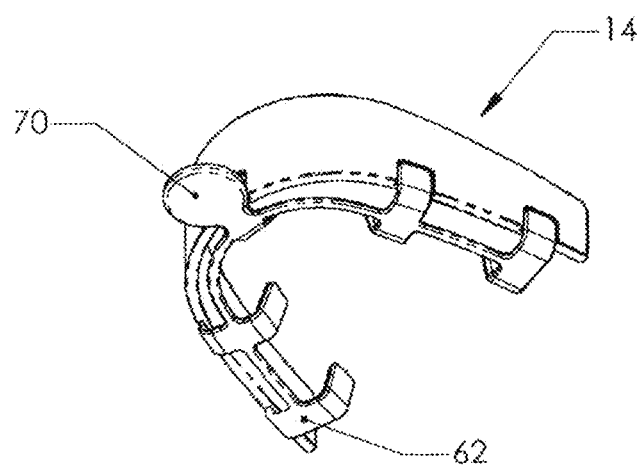
FIG. 19 illustrates a bottom perspective view of the device of the embodiment of FIG. 18.

FIGS. 18-19 show a further embodiment of the body with wall(s) and holder portion 62, however, as shown in FIGS. 18-19, the U-shaped body has arms 6 and body base end 8 in a first plane 4 with single wall (L-shaped) in cross section in a second plane 22 i.e. at least one outer wall 14 or at least one inner wall 16, separate holder portion 62, with no base wall 18.

The U-shaped body 2 in a first plane is a shape covering the outer wall of all sides of the jaw or the inner wall of all sides of the jaw and the holder portion 62 includes a separate body comprising a frame member with U shaped ribs extending laterally therefrom a trunk portion. The holder portion 62 is a frame member that is connected to or formed to a lower end of the body 2 walls 14 or 16 and abuts a low end of the teeth to then extend behind the tooth opposite to the side that the body 2 wall 14 or 16 is on.

In another variation, the holder portion 62 can be formed as separate one piece frame which, as mentioned above, can be separately attached to the outside of the body 2 or can be attached directly to the outside of the teeth and then an inner side face of the body 2 can be slotted therein whereby the body 2 is slotted and clipped into an outside of the frame.

Example 5

Figure 20:
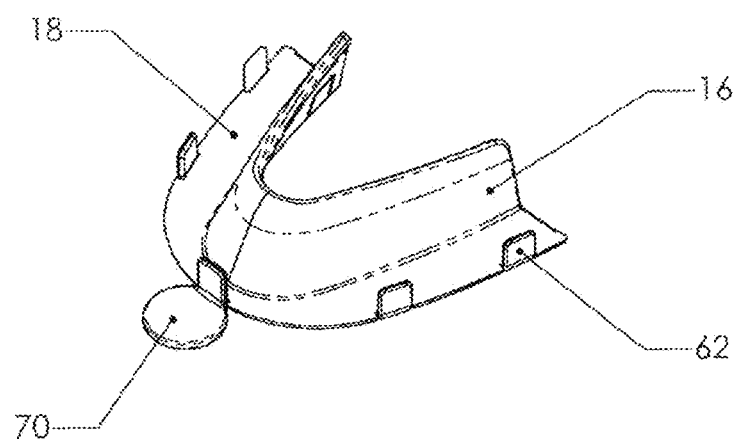
FIG. 20 illustrates an upper perspective view of a further embodiment of oral applicator device, the device having an inner wall, base wall and holder portion.
Figure 21:
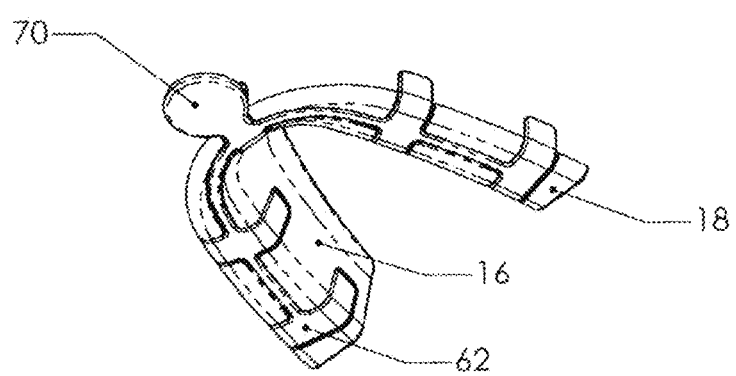
FIG. 21 illustrates a bottom perspective view of the device of the embodiment of FIG. 20.

FIGS. 20-21, illustrate a further embodiment of the device. In this case, the device 1 comprises a U shaped body 2 having arms 6 and body base end 8 in a first plane 4 with single wall (L or J-shape) in cross section in a second plane 22 i.e. at least one outer wall 14 or at least one inner wall 16 and base wall 18 with integral or separate holder portion 62. A base wall 18 may or may not be present.

Assuming a base wall 18 is present, the outer wall or inner wall is connected or formed with the base wall 18 forming the L or J-shape. The holder portion 62 is formed of a frame member with U shaped ribs extending laterally from a trunk or spine portion wherein the holder portion is connected to or formed to a lower end of the walls 14 or 16 abuts a low end of the base wall 18 to then extend behind the tooth opposite to the side the wall 14 or 16 is on.

Example 6

Figure 22:
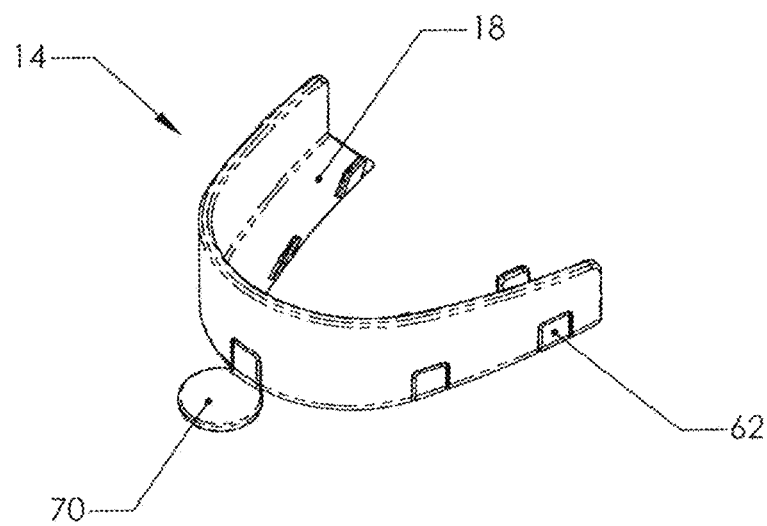
FIG. 22 illustrates an upper perspective view of a further embodiment of oral applicator device the device comprising an outer wall, base wall and holder portion.
Figure 23:
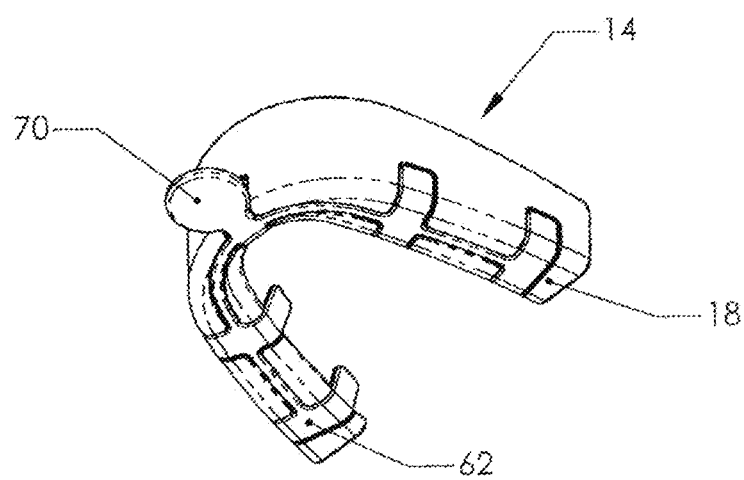
FIG. 23 illustrates a bottom perspective view of the device of the embodiment of FIG. 22.

FIGS. 22-23 show a further embodiment of the device 1. In this example, the device 1 is designed for use on one side of the jaw (i.e. teeth and gums). The device 1 has a substantially straight elongate body 2 in a first plane 4 and U shaped cross section 22 in a second plane i.e. at least one outer wall 14, at least one inner wall 16 and base wall 18, with holder portion 62. In another option the elongate body 2 can include a curved end portion to abut and hold the device to gums and teeth at the front.

In this embodiment, the body 2 is formed as an elongate channel shaped body 2 and a cross-section of the body 2 comprises an outer wall 14 and inner wall 16 joined to a base there between. The holder portion 62 is formed of a frame member with U shaped ribs extending laterally therefrom a trunk or spine portion wherein the holder portion is connected or formed to a lower end of the walls 14 or 16 abuts the bottom of the base wall 18 to then extend behind the tooth opposite to the side the wall 14 or 16 is on.

Example 7

Figure 24:
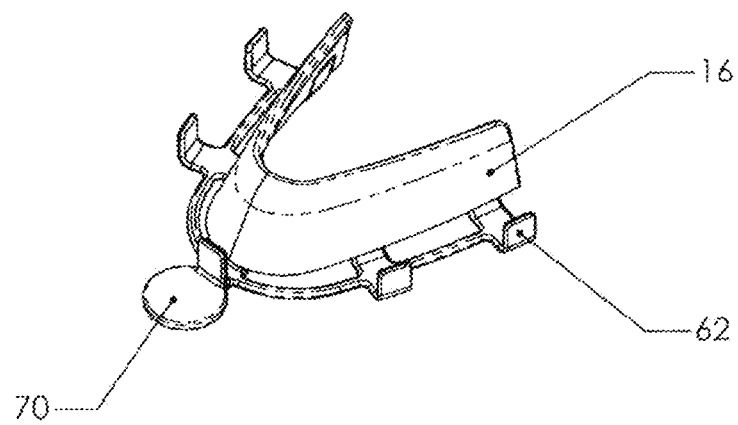
FIG. 24 illustrates an upper perspective view of a further embodiment of the oral applicator device, the device comprising an inner wall, no base wall and holder portion.
Figure 25:
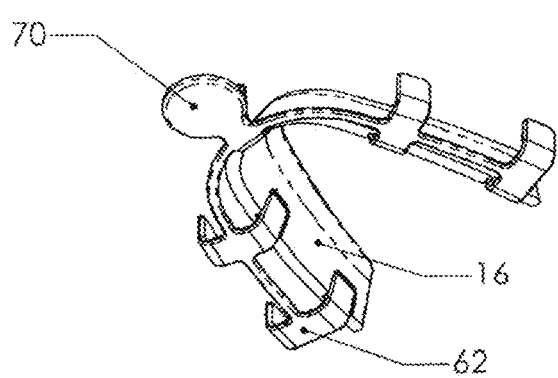
FIG. 25 illustrates a bottom perspective view of the device of the embodiment of FIG. 24.

FIGS. 24-25 illustrate a further embodiment. The device 1 in this case is designed for use on one side of the jaw (i.e. teeth and gums). It comprises a substantially straight elongate body in a first plane 4 and U shaped cross section in a second plane 22 i.e. at least one outer wall 14, at least one inner wall 16 and base wall 18, with holder portion 62 and no base wall 18. In another option the elongate body can include a curved end portion to abut and hold the device to gums and teeth of a front of the jaw.

The body 2 is formed as an elongate channel shaped body and cross section of the body includes an outer wall 14 and inner wall 16 joined to a base there between, and the holder portion 62 is formed of a frame member with U shaped ribs extending laterally therefrom a trunk portion wherein the holder portion is connected or formed to a lower end of the walls 14 or 16 abuts the bottom of the teeth to then extend behind the tooth opposite to the side the wall 14 or 16 is on.

Example 8

FIGS. 26-29 show a further single sided device 1, this time single sided in terms of mouth side but to potentially treat both sides of the gums. The device 1 is similar to earlier embodiments such as those illustrated in FIGS. 1-13 however is J-shaped in a first plane. The body 2 has outer and inner sides 14, 16 but these dies only extend along a single body 2 arm 6 so as to fit to only one side the upper or lower jaw.

Figure 26:
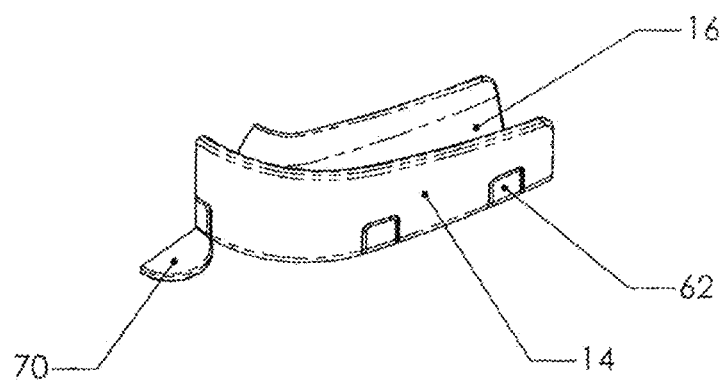
FIG. 26 illustrates an upper perspective view of a further embodiment of the oral applicator device, the device comprising an outer wall, inner wall, base wall and holder portion for one side of jaw (teeth and gums)
Figure 27:
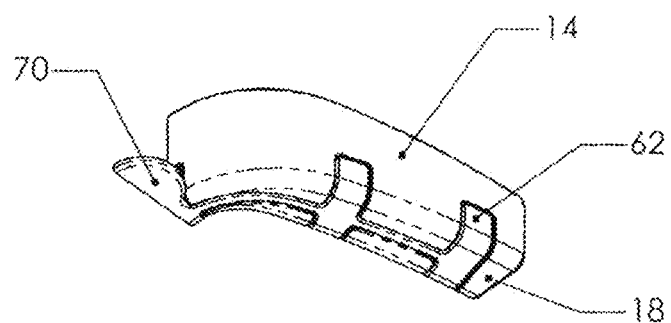
FIG. 27 illustrates a bottom perspective view of the device of the embodiment of FIG. 26.
Figure 28:
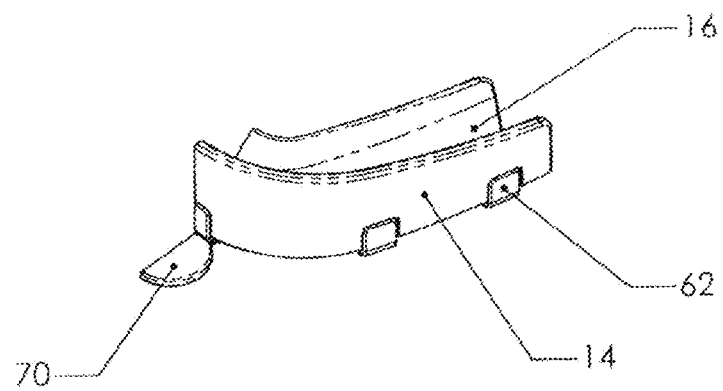
FIG. 28 illustrates an upper perspective view of a further embodiment of the oral applicator device, the device comprising an outer wall, inner wall, no base wall and holder portion for one side of jaw (teeth and gums)
Figure 29:
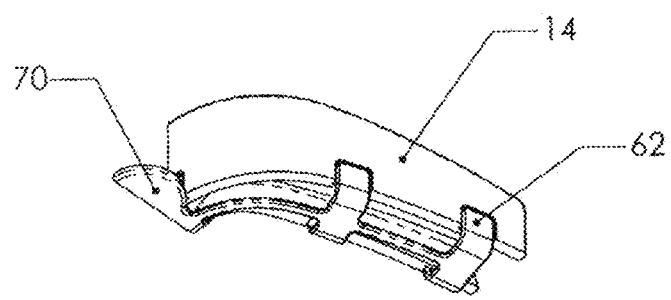
FIG. 29 illustrates a bottom perspective view of the device of the embodiment of FIG. 28.

FIGS. 26-27 show the device 1 with a base wall 18 while FIGS. 28-29 show the same device 1 with no base wall 18.

Example 9

Figure 30:
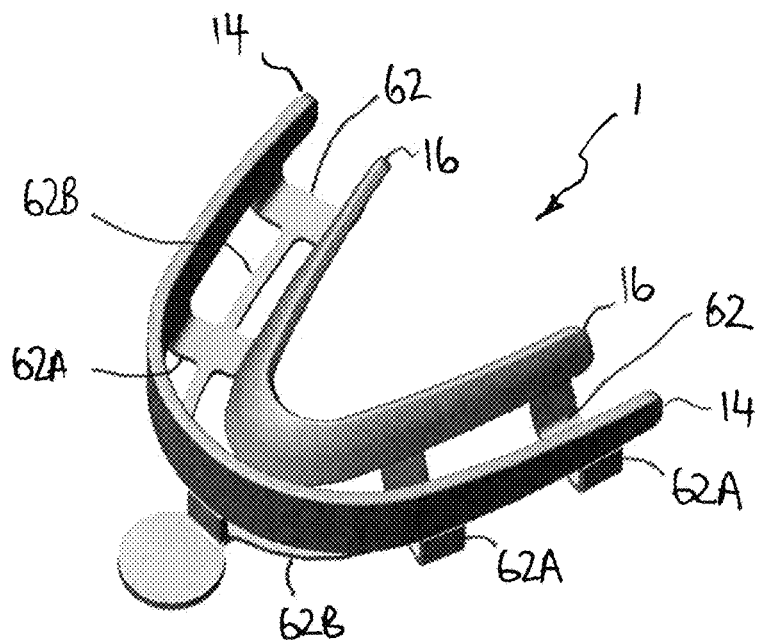
FIG. 30 illustrates a perspective view from above of a further embodiment of the device.

FIG. 30 illustrates a further embodiment of the device 1. In this embodiment the holder portion 62 can directly contact the teeth. The holder portion 62 uses the teeth (clamps over the teeth) to hold the body in place. The holder portion 62 comprises a spine 62B and ribs 62A. Attached to the ribs are wall 14, 16 of the body 2. No base wall 18 is used. The walls 14, 16 in this embodiment may be formed using the same material as the holder portion 62, where the portion acting as the body 14, 16 is softer and more flexible (using a thinner wall section or foamed portion) and the portion acting as the holder portion 62 has a more rigid wall section.

Example 10

In this example, a method of use of the device 1 is shown with reference to FIGS. 31-35.

Figure 31:
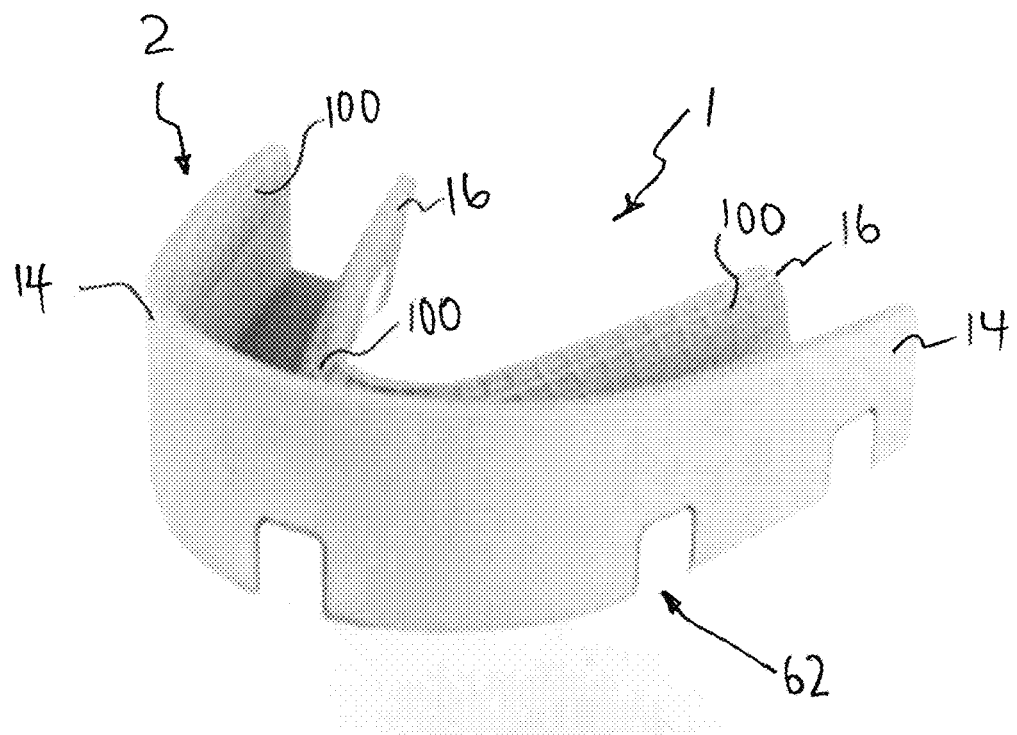
FIG. 31 illustrates a further embodiment of the device.

FIG. 31 shows a device 1 similar to that illustrated in FIGS. 1-13 however, in this embodiment a surface texture area 100 is also shown. Medicament (not shown) may be located in or on this textured surface during manufacture or before placing the device 1 into the patient's mouth.

Optionally, the shape the body of the device 1 may be shaped or moulded to match an outward shape of a jaw of a patient.

Figure 32:
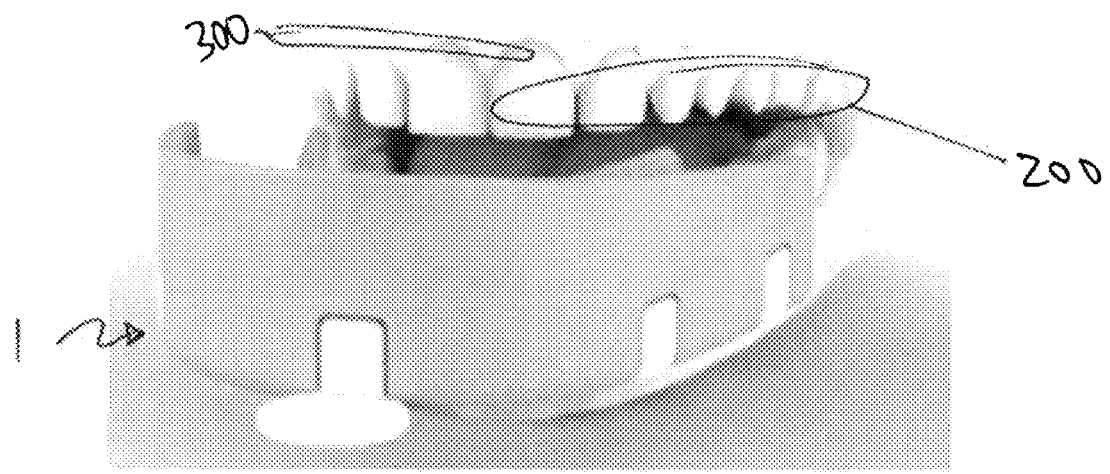
FIG. 32 illustrates the device of FIG. 31 partly inserted into a patient's mouth.
Figure 33:
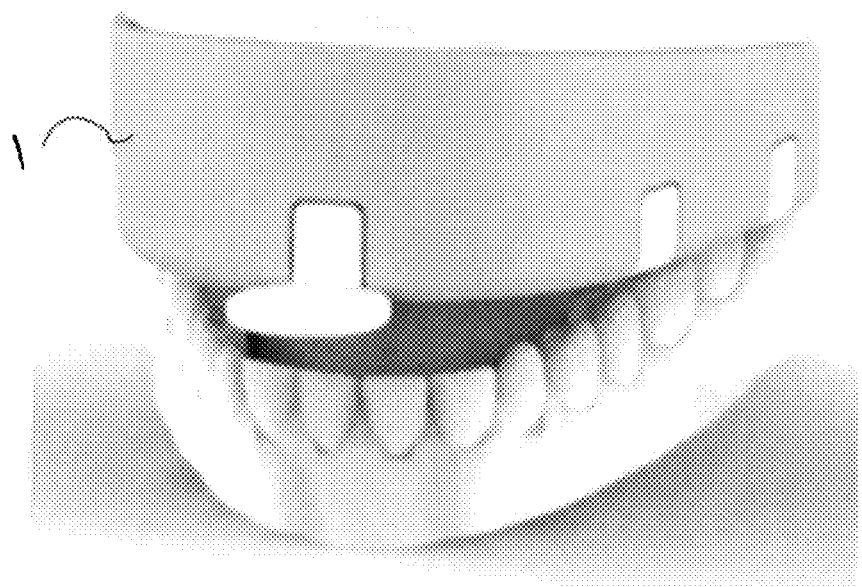
FIG. 33 illustrates the device of FIG. 31 fully inserted into a patient's mouth.

As shown in FIG. 32, the device 1 is slid into the patient's mouth and then, as shown in FIG. 33, the device 1 is moved upwards against the top teeth 200 of the patient's mouth so that the patient's upper teeth 200 and gums 300 are captured in the body 2 inner, outer walls and base wall. As should be appreciated, for a fit to bottom teeth, the device 1 would be moved downwards.

Whilst the FIGS. 31-35 use a holder and body fixed together before use, the body may be inserted first into the patient's mouth and the holder fitted thereafter.

Yet other options include clipping the holder portion 62 into slots on a lower portion of inner, outer and base walls.

Optionally, a user could squeeze the holder portion or a part thereof towards the teeth 200 to cause the lower portion of the walls 14, 16, 18 to clamp the body 2 to the teeth 200 while keeping the upper portion of an inner surface of the walls 14, 16, 18 to abut or touch the gums 300 to apply the medicament to the gums 300 as required.

Figure 34:
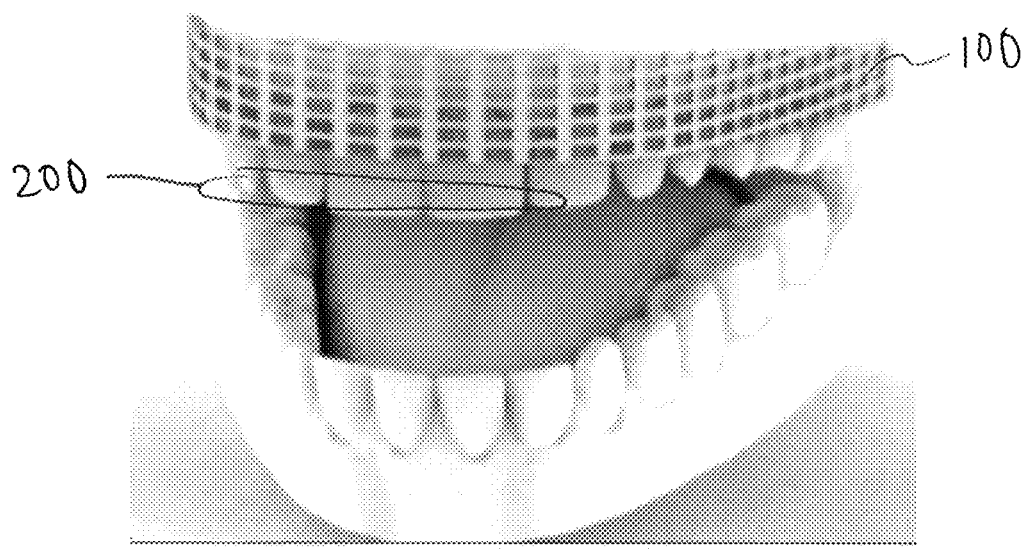
FIG. 34 illustrates the device of FIG. 31 fully inserted into a patient's mouth and partially transparent.
Figure 35:
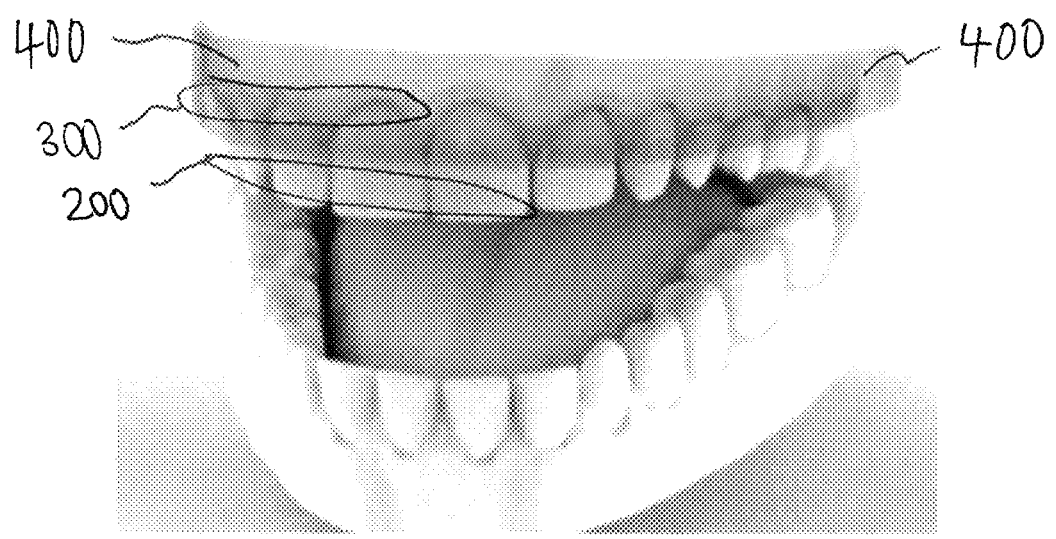
FIG. 35 illustrates the patient's mouth post removal of the device.

FIG. 34 shows the device 1 with parts of the device 1 removed to better show the textured region 100 located about the patient's gums 300) targeted by the device 1 for transfer of medicament. FIG. 35 shows the patient's mouth post removal of the device 1, the highlighted region 400 showing where transfer of medicament has occurred.

Aspects of the intraoral applicator device and related methods of use have been described by way of example only and it should be appreciated that modifications and additions may be made thereto without departing from the scope of the claims herein.

The invention claimed is:
1. An intraoral applicator device for delivering a medicament to the soft tissue of a patient's oral cavity, the device comprising:
a body with a shape and configuration that generally conforms with at least part of the shape of the teeth and soft tissue of the patient's oral cavity, the body interior having a wall or walls that align with the sides of the teeth extending from the soft tissue to the teeth top, so that, when fitted to a patient's oral cavity, the body interior wall or walls are configured to at least partly bear against at least part of the patient's soft tissue adjacent to the teeth; wherein the body comprises a resilient memory-type material; and
a holder portion, the holder portion comprising a frame, the frame being configured to clamp over the teeth in the patient's oral cavity such that, when fitted to the patient's oral cavity, at least a part of the holder portion is configured to be held between an upper and lower set of teeth when brought together in occlusion, the holder portion also gripping at least part of the body, wherein the holder comprises a resilient material capable of retaining its shape,
wherein the holder portion applies more clamping to the wall or walls adjacent to the teeth and less pressure as the wall or walls go upward towards the soft tissue;
wherein the frame comprises a spine with a first plurality of ribs extending laterally from a first side of the spine and a second plurality of ribs extending laterally from a second side of the spine, wherein the body is compressed by a force exerted by the first plurality of ribs and the second plurality of ribs; and,
wherein the holder portion when fitted to a patient's oral cavity indirectly bears on the body wall or walls proximal to the holder, urging at least part of the body wall or walls to bear against the side or sides of the patient's teeth proximal to the body;
wherein an upper portion of an inner surface or surfaces of the body is configured to receive medicament and transfer medicament to soft tissue when fitted and minimize transfer of medicament to the patient's teeth.

2. The intraoral applicator device as claimed in claim 1 wherein the device fits to at least one of the teeth located in the patient's mandible.

3. The intraoral applicator device as claimed in claim 1 wherein the device fits to at least one of the teeth located in the patient's maxilla.

4. The intraoral applicator device as claimed in claim 1 wherein the body interior at least partly snug fits directly or indirectly to the teeth and simultaneously at least partly snug fits a portion of the body interior to the soft tissue of the patient's mouth when fitted.

5. The intraoral applicator device as claimed in claim 1 wherein the body comprises:
an outer wall, the interior of which when fitted faces the outside of a patient's teeth and soft tissue; or an inner wall the interior of which when fitted faces the inside of a patient's teeth and soft tissue; and
wherein the holder supports the inner or outer wall of the body in a position that aligns the inner or outer wall of the body with the outside or inside of the person's teeth and soft tissue when fitted to the patient's mouth.

6. The intraoral applicator device as claimed in claim 1 wherein the body comprises:
an outer wall the interior of which when fitted faces the outside of a patient's teeth and soft tissue; or an inner wall the interior of which when fitted faces the inside of a patient's teeth and soft tissue; and a base wall, the base wall being linked to the outer wall or inner wall and, when fitted in a patient's mouth, aligning generally over the patient's teeth; and
wherein the holder supports the inner or outer wall and base wall of the body in a position that aligns the inner or outer wall of the body with the outside or inside of the patient's teeth and soft tissue when fitted to the patient's mouth.

7. The intraoral applicator device as claimed in claim 1 wherein the body comprises:
an outer wall the interior of which when fitted faces the outside of a patient's teeth and soft tissue; and
an inner wall the interior of which when fitted faces the inside of a patient's teeth and soft tissue; and
a base wall, the base wall being linked to the outer wall and inner wall and, when fitted in a patient's mouth, the base wall aligning generally over the patient's teeth; and
wherein the holder supports the inner wall, outer wall and base wall of the body in a position that aligns the inner wall and outer wall of the body with the outside or inside of the patient's teeth and soft tissue when fitted to the patient's mouth.

8. The intraoral applicator device as claimed in claim 1 wherein the body and holder are generally U-shaped or J-shaped in a first plane.

9. The intraoral applicator device as claimed in claim 1 wherein the body and holder are generally elongated and straight in a first plane.

10. The intraoral applicator device as claimed in claim 1 wherein the body and holder are generally U-shaped or J-shaped in a second plane.

11. The intraoral applicator device as claimed in claim 1 wherein the body and holder are generally elongated and straight in a second plane.

12. The intraoral applicator device as claimed in claim 1 wherein the spine follows a line generally coincident with the teeth and at least one rib of the plurality of ribs extends generally orthogonally from the spine.

13. The intraoral applicator device as claimed in claim 12 wherein a lower portion of the body is thicker than an upper portion.

14. The intraoral applicator device as claimed in claim 12 wherein the wall or walls are manufactured from any suitable material and wherein an upper portion of the inner surface of the wall includes a first additive to create a more flexible area.

15. The intraoral applicator device as claimed in claim 12 wherein a lower portion of the inner surface of the wall includes a second additive to create a more rigid area.

16. The intraoral applicator device as claimed in claim 1 wherein the holder is manufactured from a material which retains its shape once moulded.

17. A method of delivering a medicament to at least a portion of the soft tissue of a patient in need thereof by the steps comprising:
   providing a device as claimed in claim 1;
   optionally apply medicament to at least part of an inside wall of the body;
   shaping the body of device to match the outward shape of the jaw of the patient;
   and slide the body into the patient's mouth to partly enclose the patient's teeth and locate the body such that an inner surface of an upper portion of outer wall and/or inner wall, abuts the soft tissue which abuts a bottom of the teeth;
   apply the holder to the body; and leave the device in place for sufficient time to ensure transfer and activity of the medicament to the soft tissue; or
   apply the holder to the body; slide the body into the patient's mouth to partly enclose the patient's teeth and locate the body such that an inner surface of an upper portion of outer wall and/or inner wall, abuts the soft tissue which abuts a bottom of the teeth; and
   leave the device in place for sufficient time to ensure transfer and activity of the medicament to the soft tissue.

18. A method of delivering a medicament to at least a portion of the soft tissue of a patient in need thereof by the steps comprising:
   providing a device as claimed in claim 1;
   optionally apply medicament to at least part of an inside wall of the body;
   shaping the body of device to match the outward shape of the jaw of the patient; and
   slide the body and holder into the patient's mouth to partly enclose the patient's teeth and locate the body such that an inner surface of an upper portion of outer wall and/or inner wall, bear on the soft tissue and bottom of the teeth; and
   leave the device in place for sufficient time to ensure transfer and activity of the medicament to the soft tissue.

19. The method as claimed in claim 17 wherein, once fitted, the holder or a part thereof is squeezed to apply pressure onto the body and teeth to cause the lower portion of the wall or walls to clamp the body to the teeth.

20. The intraoral applicator device as claimed in claim 1 wherein the body is manufactured from a silicone material.

21. The intraoral applicator device as claimed in claim 1 wherein the body is manufactured from a polypropylene foam material.

* * * * *